(12) United States Patent
Park et al.

(10) Patent No.: US 10,616,549 B2
(45) Date of Patent: Apr. 7, 2020

(54) APPLICATION PROCESSOR FOR DISPARITY COMPENSATION BETWEEN IMAGES OF TWO CAMERAS IN DIGITAL PHOTOGRAPHING APPARATUS

(71) Applicant: SAMSUNG ELECTRONICS CO., LTD., Suwon-si, Gyeonggi-do (KR)

(72) Inventors: Dong Jin Park, Hwaseong-si (KR); Seok Jae Kang, Hwaseong-si (KR); Jee Hong Lee, Hwaseong-si (KR); Joon Hyuk Im, Seoul (KR); Chae Sung Kim, Seoul (KR)

(73) Assignee: SAMSUNG ELECTRONICS CO, LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/878,540

(22) Filed: Jan. 24, 2018

(65) Prior Publication Data
US 2018/0376122 A1 Dec. 27, 2018

(30) Foreign Application Priority Data
Jun. 23, 2017 (KR) .......................... 10-2017-0079782

(51) Int. Cl.
*H04N 13/139* (2018.01)
*H04N 13/167* (2018.01)
(Continued)

(52) U.S. Cl.
CPC ......... *H04N 13/128* (2018.05); *H04N 5/2258* (2013.01); *H04N 5/23216* (2013.01);
(Continued)

(58) Field of Classification Search
CPC .. H04N 13/128; H04N 13/271; H04N 13/296; H04N 5/23216; H04N 5/265; H04N 5/23293; G01S 19/53; G01S 19/42
See application file for complete search history.

(56) References Cited

U.S. PATENT DOCUMENTS 7,307,654 B2 12/2007 Chang
7,330,584 B2 2/2008 Wieguo et al.
(Continued)

FOREIGN PATENT DOCUMENTS

JP 2016195323 11/2016
KR 1020140142010 12/2014

*Primary Examiner* — Philip P. Dang
(74) *Attorney, Agent, or Firm* — F. Chau & Associates, LLC

(57) ABSTRACT

A digital photographing device may include a plurality of cameras on a common side of the device, an application processor for switching image capture between the camera, and a display. The application processor may switch images output on the display when the cameras are switched. During the image transition, one or more virtual viewpoint images are output between a pre-transition image and a post-transition image. The virtual viewpoint images interpolate a disparity between the pre-transition image and the post-transition image caused by the different cameras being located at different positions, and result in a smooth visual transition. When a camera switching input includes a zoom factor signal, the virtual viewpoint images may be compensated images according to the input zoom factor and a disparity.

20 Claims, 15 Drawing Sheets

(51) Int. Cl.
  *H04N 13/128* (2018.01)
  *H04N 5/265* (2006.01)
  *H04N 5/232* (2006.01)
  *H04N 13/271* (2018.01)
  *H04N 13/296* (2018.01)
  *H04N 13/111* (2018.01)
  *H04N 5/262* (2006.01)
  *H04N 5/225* (2006.01)
  *G01S 19/53* (2010.01)
  *G01S 19/42* (2010.01)
  *H04N 13/00* (2018.01)

(52) U.S. Cl.
  CPC ..... *H04N 5/23219* (2013.01); *H04N 5/23232* (2013.01); *H04N 5/232933* (2018.08); *H04N 5/232945* (2018.08); *H04N 5/265* (2013.01); *H04N 5/2621* (2013.01); *H04N 5/2628* (2013.01); *H04N 13/111* (2018.05); *H04N 13/271* (2018.05); *H04N 13/296* (2018.05); *G01S 19/42* (2013.01); *G01S 19/53* (2013.01); *H04N 5/23293* (2013.01); *H04N 2013/0081* (2013.01)

(56) References Cited

U.S. PATENT DOCUMENTS

| | | | |
|---|---|---|---|
| 7,689,934 B2* | 3/2010 | Neervoort | G06F 3/0485 715/701 |
| 8,412,577 B2* | 4/2013 | Rodriguez | G06F 3/011 382/100 |
| 8,571,380 B2* | 10/2013 | Sugano | G06F 3/048 386/230 |
| 8,672,838 B2* | 3/2014 | McDowall | A61B 1/00009 600/129 |
| 8,784,301 B2* | 7/2014 | McDowall | G02B 27/0075 600/109 |
| 8,811,669 B2* | 8/2014 | Sugio | G06T 7/248 382/103 |
| 8,867,823 B2 | 10/2014 | Wildeboer et al. | |
| 9,152,226 B2 | 10/2015 | Forutanpour et al. | |
| 9,165,535 B2* | 10/2015 | Dureau | G09G 5/373 |
| 9,197,816 B2* | 11/2015 | Laroia | G02B 13/02 |
| 9,211,058 B2* | 12/2015 | McDowall | A61B 1/00186 |
| 9,285,589 B2 | 3/2016 | Osterhout et al. | |
| 9,323,325 B2 | 4/2016 | Perez et al. | |
| 9,360,671 B1 | 6/2016 | Zhou | |
| 9,438,877 B2 | 9/2016 | Wakabayashi et al. | |
| 9,521,328 B2 | 12/2016 | Kim et al. | |
| 9,529,428 B1 | 12/2016 | Bhattacharya et al. | |
| 9,600,923 B2* | 3/2017 | Redmann | G06T 3/40 |
| 9,652,678 B2* | 5/2017 | Yang | G06F 3/04883 |
| 9,661,215 B2* | 5/2017 | Sivan | H04N 19/597 |
| 9,704,254 B2* | 7/2017 | Huang | G06T 7/593 |
| 9,782,056 B2* | 10/2017 | McDowall | G02B 27/0075 |
| 9,807,300 B2* | 10/2017 | Han | H04N 5/23222 |
| 10,068,373 B2* | 9/2018 | Lee | G06F 3/0488 |
| 10,169,904 B2* | 1/2019 | Donovan | G06F 3/011 |
| 10,210,597 B2* | 2/2019 | Scholl | G06T 3/0018 |
| 10,217,007 B2* | 2/2019 | Xie | G06K 9/00201 |
| 2003/0034395 A1* | 2/2003 | Tsikos | G02B 26/10 235/454 |
| 2011/0050731 A1* | 3/2011 | Chiu | G06F 3/0481 345/660 |
| 2012/0182401 A1* | 7/2012 | Kobayashi | H04N 13/122 348/51 |
| 2013/0293683 A1 | 11/2013 | Zhou et al. | |
| 2013/0328864 A1* | 12/2013 | Lee | G09G 5/14 345/419 |
| 2014/0168056 A1 | 6/2014 | Swaminathan et al. | |
| 2014/0184744 A1* | 7/2014 | Liu | H04N 19/597 348/43 |
| 2014/0250406 A1* | 9/2014 | Seo | G06F 3/0488 715/781 |
| 2015/0156803 A1 | 6/2015 | Ballard et al. | |
| 2015/0381965 A1* | 12/2015 | Atanassov | H04N 5/23245 348/47 |
| 2016/0050374 A1 | 2/2016 | Shabtay et al. | |
| 2016/0165215 A1 | 6/2016 | Gu et al. | |
| 2016/0337612 A1 | 11/2016 | Im et al. | |
| 2017/0064215 A1* | 3/2017 | Cho | H04N 5/268 |
| 2017/0078637 A1* | 3/2017 | Hayasaka | G06T 3/4007 |
| 2017/0264964 A1* | 9/2017 | Yoon | H04L 65/105 |
| 2017/0272727 A1* | 9/2017 | Jiang | H04N 13/128 |
| 2017/0330330 A1* | 11/2017 | Seki | G06T 7/254 |
| 2018/0061068 A1* | 3/2018 | Jiao | G06T 5/50 |
| 2018/0104106 A1* | 4/2018 | Lee | A61F 9/08 |
| 2018/0116756 A9* | 5/2018 | McDowall | A61B 90/37 |
| 2018/0139431 A1* | 5/2018 | Simek | H04N 5/2258 |
| 2018/0225866 A1* | 8/2018 | Zhang | G06T 17/00 |
| 2019/0122439 A1 | 4/2019 | Thiebaud | G06T 15/503 |
| 2019/0133692 A1* | 5/2019 | Mariampillai | G01B 11/245 |

* cited by examiner

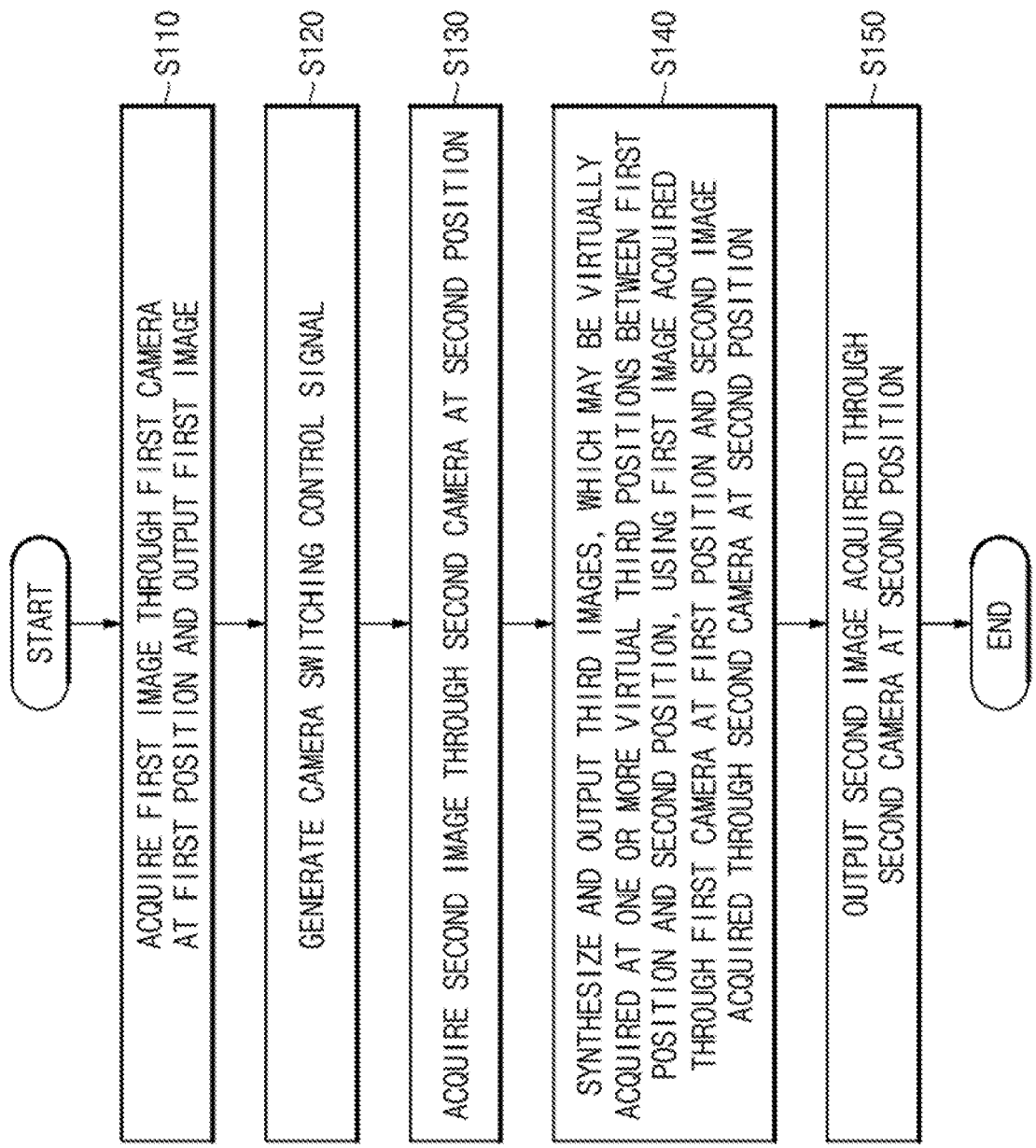

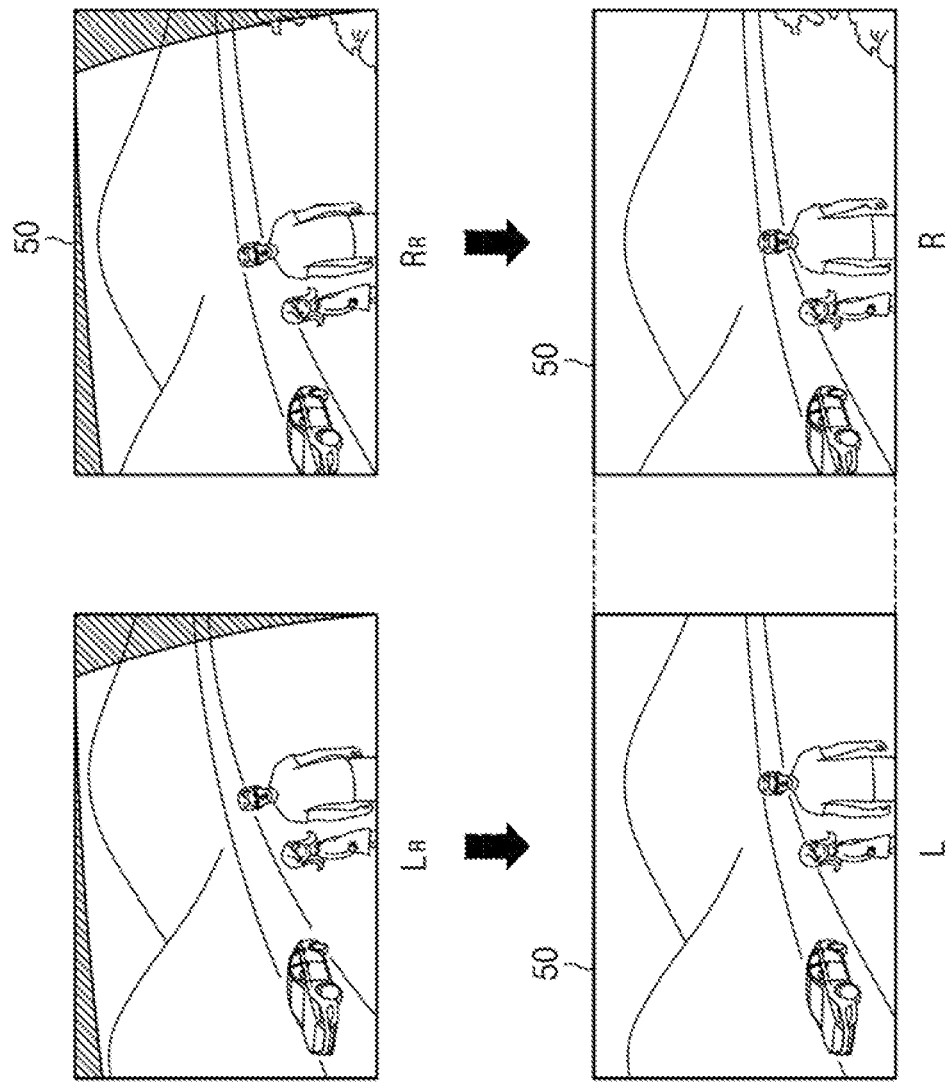

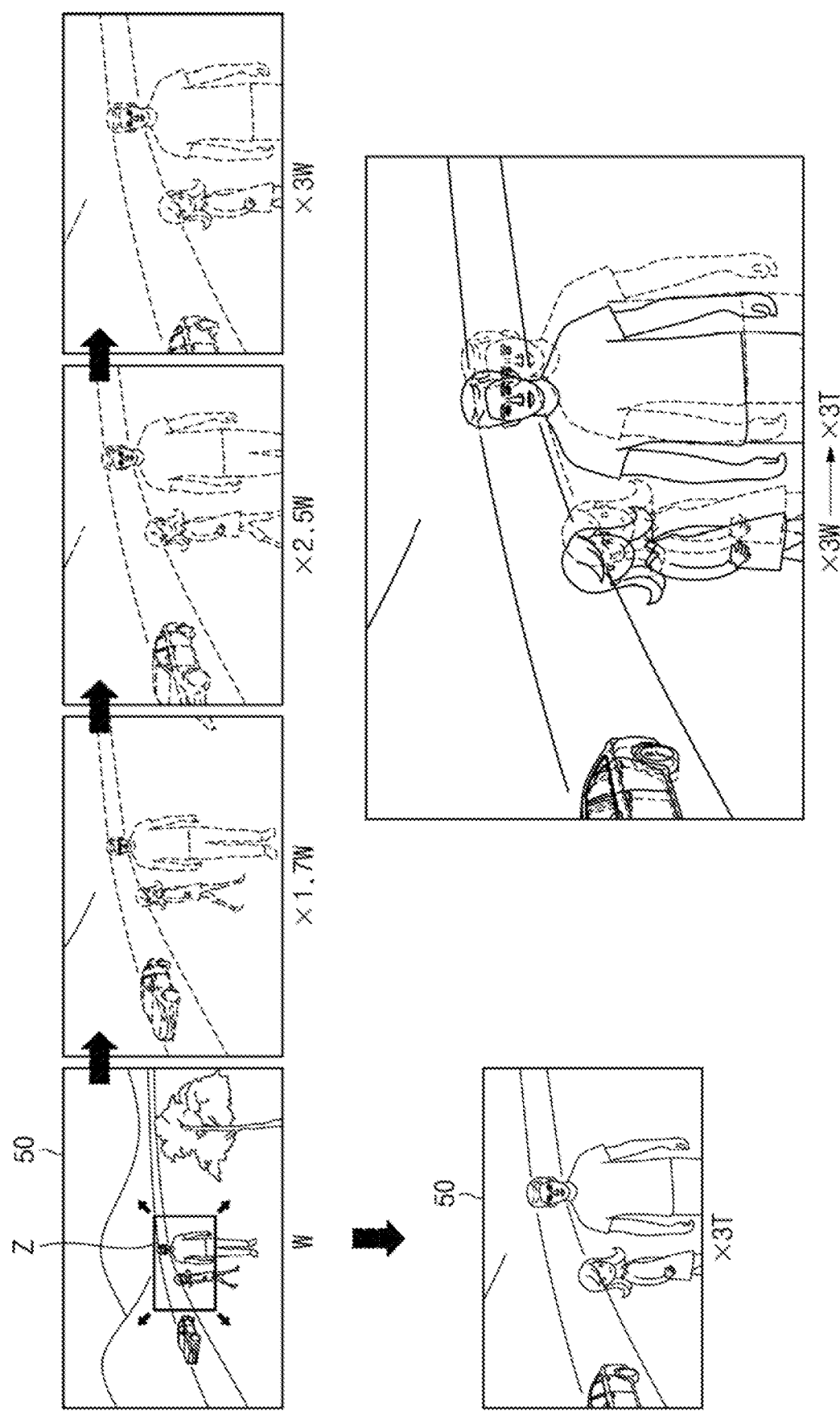

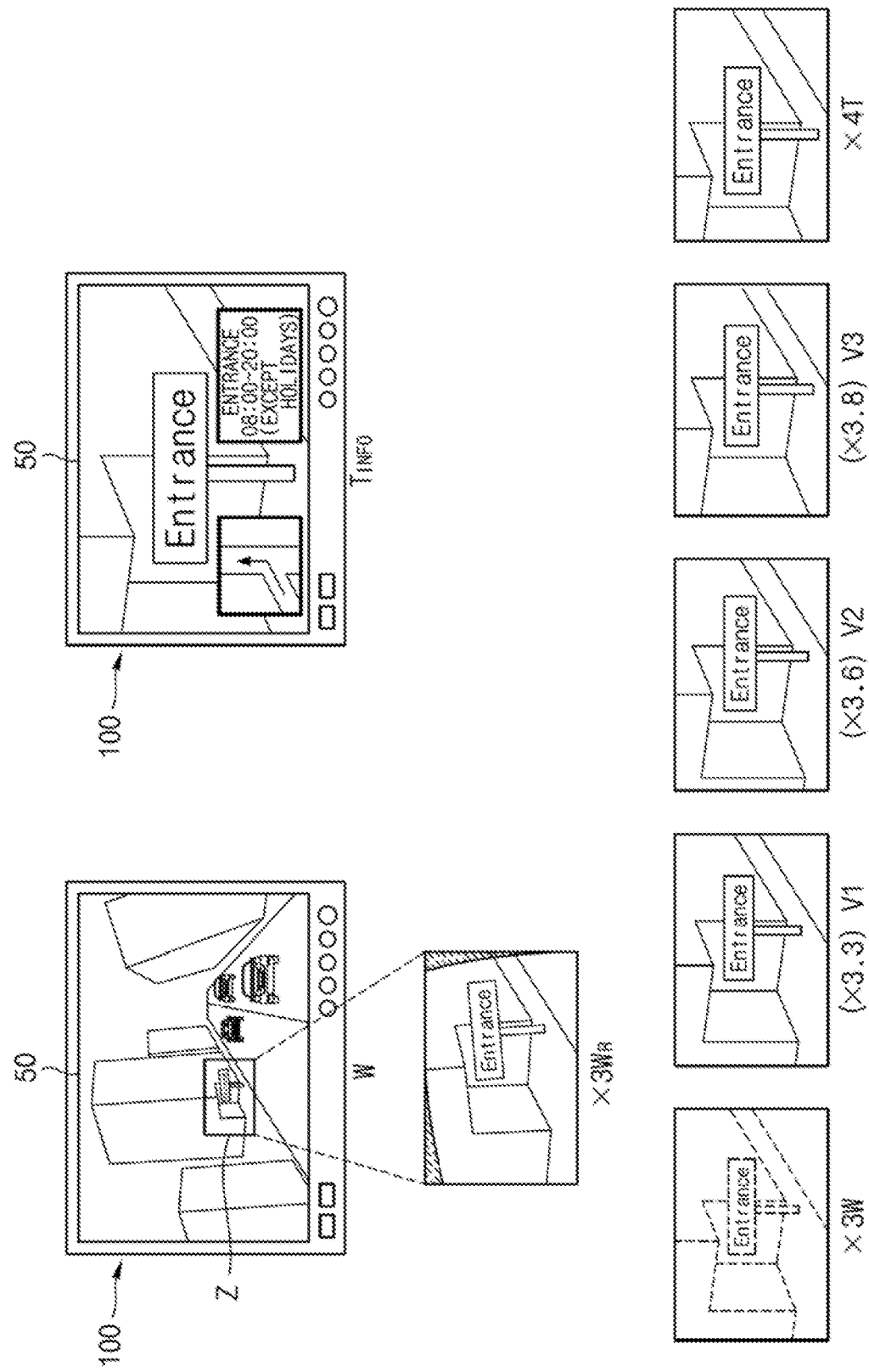

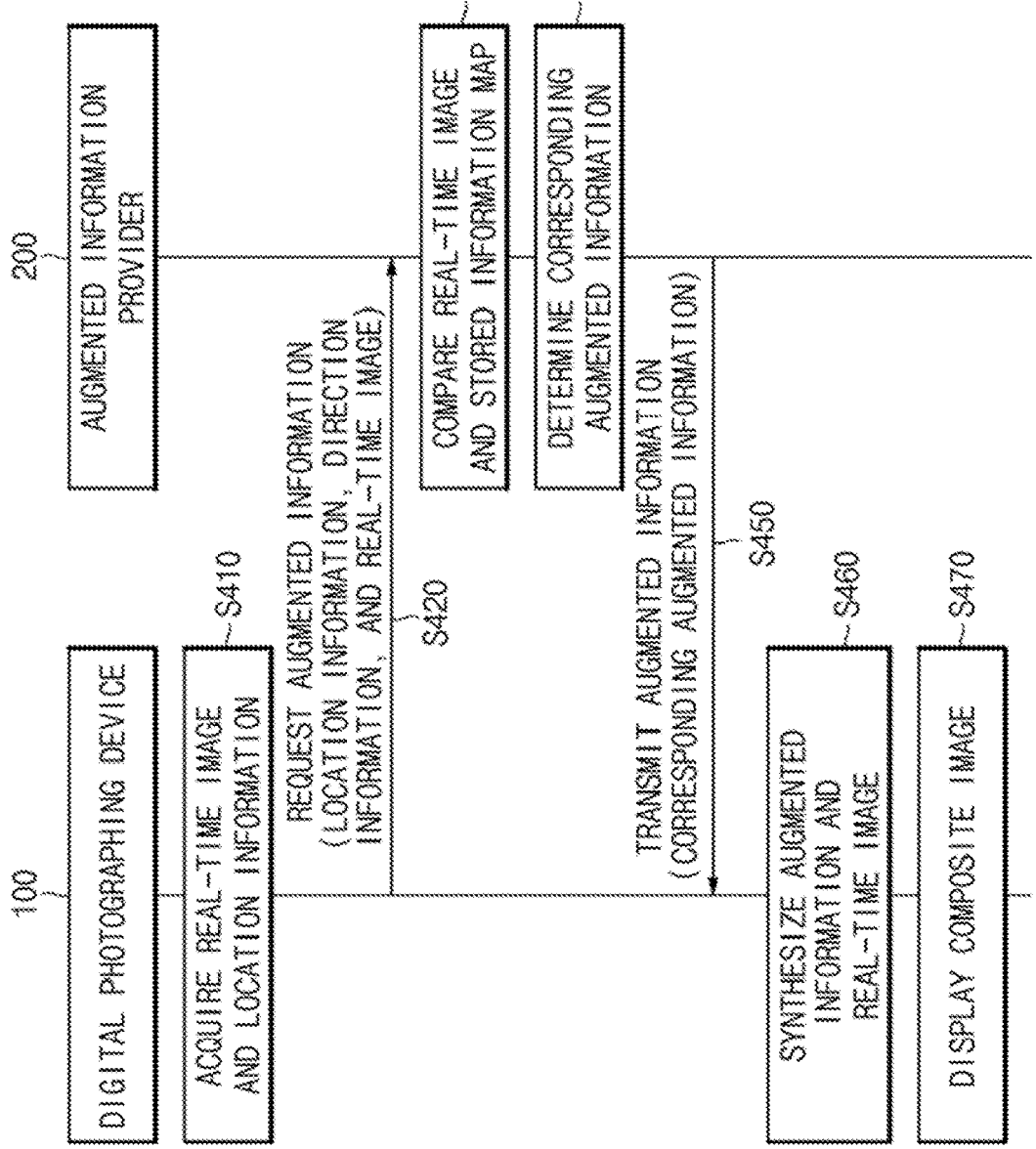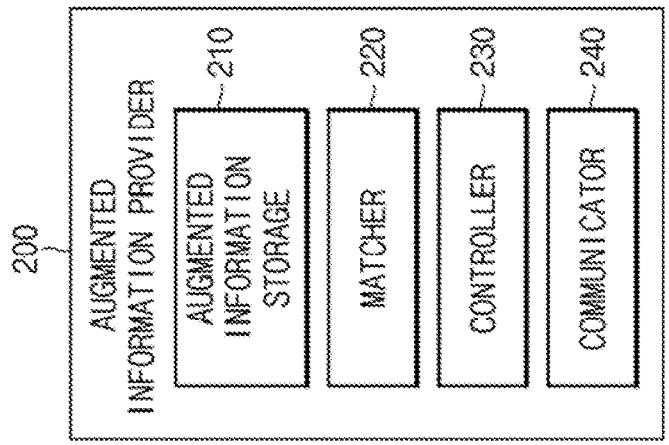

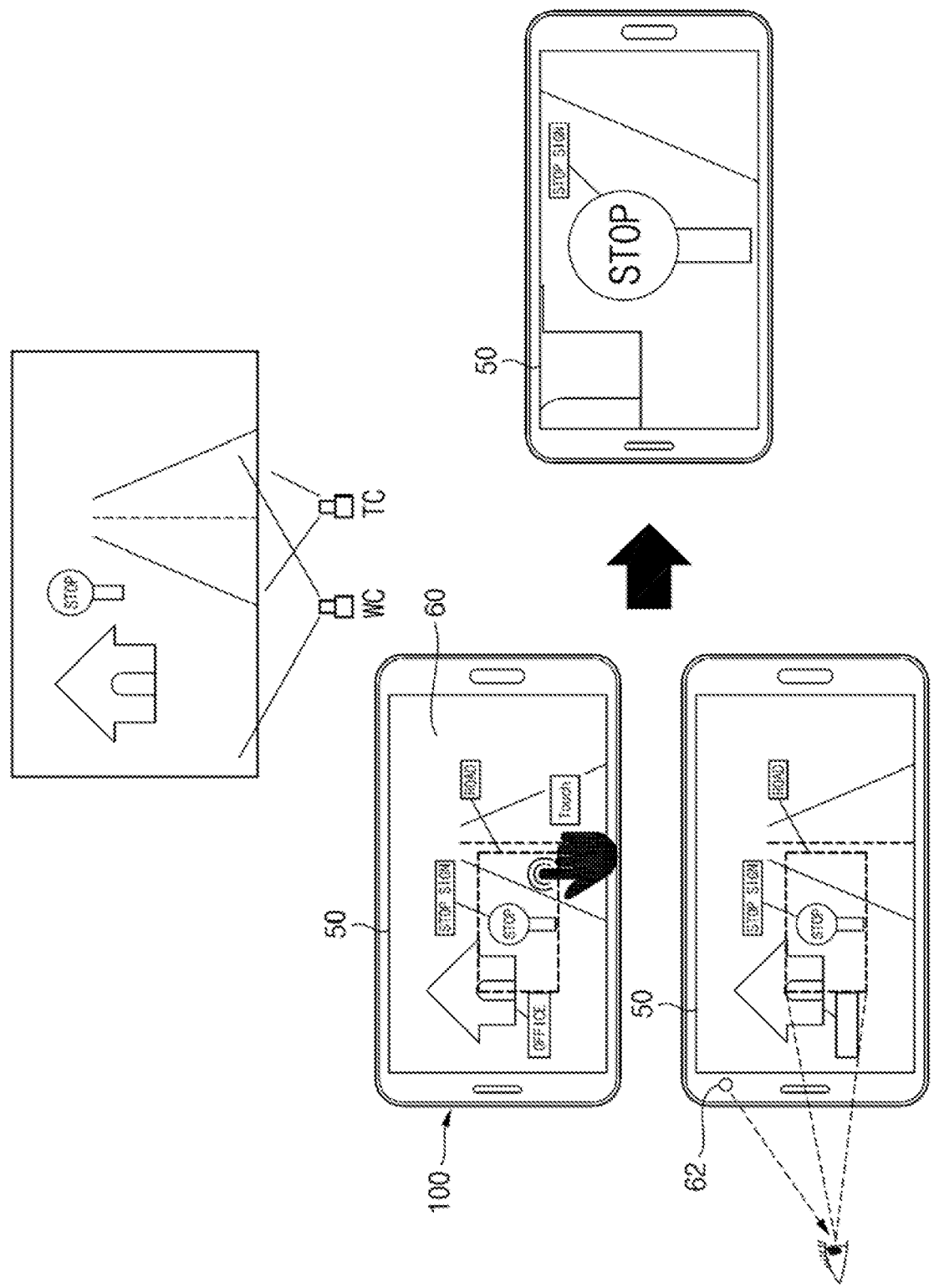

APPLICATION PROCESSOR FOR DISPARITY COMPENSATION BETWEEN IMAGES OF TWO CAMERAS IN DIGITAL PHOTOGRAPHING APPARATUS

CROSS-REFERENCE TO RELATED APPLICATION

This application claims priority under 35 U.S.C. 119(a) to Korean Patent Application No. 2017-0079782, filed on Jun. 23, 2017 in the Korean Intellectual Property Office, the disclosure of which is incorporated herein by reference in its entirety.

BACKGROUND

1. Technical Field

The present disclosure relates generally to an application processor for digital photography and more particularly to disparity compensation in a multi-camera digital photographing device.

2. Discussion of Related Art

Recent designs for some digital cameras and camera-equipped smart phones and tablets have incorporated a plurality of cameras on the same side of the device. Typically, two rear-facing cameras are disposed on the rear side of the device, and a display is provided on the front side with an optional front-facing camera.

The plurality of cameras disposed on the rear side of the digital photographing device may selectively capture wide-angle images or telephoto images independently or according to a combination thereof, and display or store the captured images. For instance, one rear camera may have a wide angle lens while the other has a telephoto or zoom lens. A user may select between a wide angle view and a telephoto view, thereby switching the operating camera. In one application, various visual effects such as background blurring or 3D effects may be realized using schemes for combining the captured images.

When the plurality of cameras are provided at different positions, a disparity occurs between images captured by the plurality of cameras due to a distance between the cameras and three-dimensional (3D) rotation of an optical axis between the cameras. The disparity varies according to a distance between the photographing device and an object in the scene being captured.

SUMMARY

When a means of capturing an image output on the display in a related art digital photographing device is switched from one camera to another, a position of an object in the scene is changed abruptly due to a disparity between the images of both cameras. This may result in a jerky effect in which an image transition becomes discontinuous.

Embodiments of the present disclosure may enable a smooth image transition when images separately acquired by different cameras are switched on the display. A smooth transition may be achieved by sequentially outputting virtual images which compensate for a disparity between a pre-transition image and a post-transition image.

Aspects of the present disclosure are not limited to those mentioned above, and additional aspects will be apparent to those of ordinary skill in the art from the description below.

According to an aspect of the present disclosure, there is provided an application processor comprising a central processor. The central processor performs the following: while a first image acquired by a first camera at a first position is displayed, generate a control signal so that a second image acquired by a second camera at a second position is displayed thereafter; generate one or more third images, which are virtually acquired at one or more third positions between the first position and the second position, using elements of the first image and the second image, in response to the control signal; and control the one or more third images to be sequentially displayed temporally between the displaying of the first image and the second image.

According to another aspect of the present disclosure, there is provided an application processor including: an input/output (I/O) interface configured to receive a user input including a zoom factor; and a central processor. The central processor is configured to perform the following operations: while a first image of a scene acquired from a first camera having a first angle of view at a first position is displayed, generate a control signal so that a second image of at least a portion of the scene acquired by a second camera having a second angle of view at a second position is displayed thereafter; generate one or more third images, which are virtually acquired at one or more third positions between the first position and the second position, using a first zoom image acquired from the first camera and a second zoom image acquired from the second camera according to at least one zoom factor between a first zoom factor and a second zoom factor; control the one or more third images to be sequentially displayed temporally between the displaying of the first image and second image; and control the second image to be displayed when the zoom factor becomes the second zoom factor.

According to still another aspect of the present disclosure, there is provided a digital photographing device including: a wide-angle camera configured to acquire a wide-angle image of a scene at a first position; a telephoto camera configured to acquire a telephoto image of a portion of the scene at a second position; a display; and an application processor. The application processor is configured to: receive a zoom request signal for a specific region in the wide-angle image when the wide-angle image is displayed; in response to the zoom request signal, generate one or more third images, which are virtually acquired at one or more third positions between the first position and the second position using image elements of: i) a zoom wide-angle image based on the wide-angle image and including the specific region; and ii) a zoom telephoto image based on the telephoto image and including the specific region. The application processor may control the display to sequentially output, temporally, the wide-angle image, the zoom wide-angle image, the one or more third images, and the zoom telephoto image. A communicator is configured to transmit the zoom telephoto image and location information and direction information associated with the zoom telephoto image and to receive augmented information matched to the zoom telephoto image.

BRIEF DESCRIPTION OF THE DRAWINGS

The above and other aspects, features and advantages of the present disclosure will become more apparent to those of ordinary skill in the art by describing exemplary embodiments thereof in detail with reference to the accompanying drawings, in which:

FIG. 4 is a flowchart of an operating method of a digital photographing device including an application processor according to an exemplary embodiment of the present disclosure;

FIG. 5A shows an example display images captured respectively by left and right cameras, and corrected images with geometrical corrections made to the captured images;

FIG. 7 is a diagram showing a picture-quality difference and a disparity between different images acquired through a plurality of cameras having different angles of view at different positions due to a zoom input by an application processor according to an exemplary embodiment of the present disclosure;

FIG. 12 is a diagram showing camera switching and augmented information providing operations of a digital photographing device according to an exemplary embodiment of the present disclosure;

FIG. 13A is a block diagram of an augmented information provider of an electronic system;

FIG. 13B is a flow diagram illustrating an example method of providing augmented information from the augmented information provider to a digital photographing device according to an exemplary embodiment; and FIG. 14 is a diagram showing a camera switching method of a digital photographing device according to an exemplary embodiment.

DETAILED DESCRIPTION

Hereinafter, a digital photographing device and an application processor according to exemplary embodiments of the present disclosure will be described with reference to the accompanying drawings.

An application processor according to an exemplary embodiment of the present disclosure is a semiconductor device used in a digital photographing device and the like. The digital photographing device may be a digital camera, a tablet personal computer (PC), a smart phone, a laptop computer, a wearable device, and the like, or a device including them. The digital photographing device may include a plurality of cameras having charge-coupled device (CCD) image sensors or complementary metal oxide semiconductor (CMOS) image sensors. The plurality of cameras provided in the digital photographing device according to an exemplary embodiment are disposed at different positions and may each be the same type of camera or may differ from one another.

Figure 1:
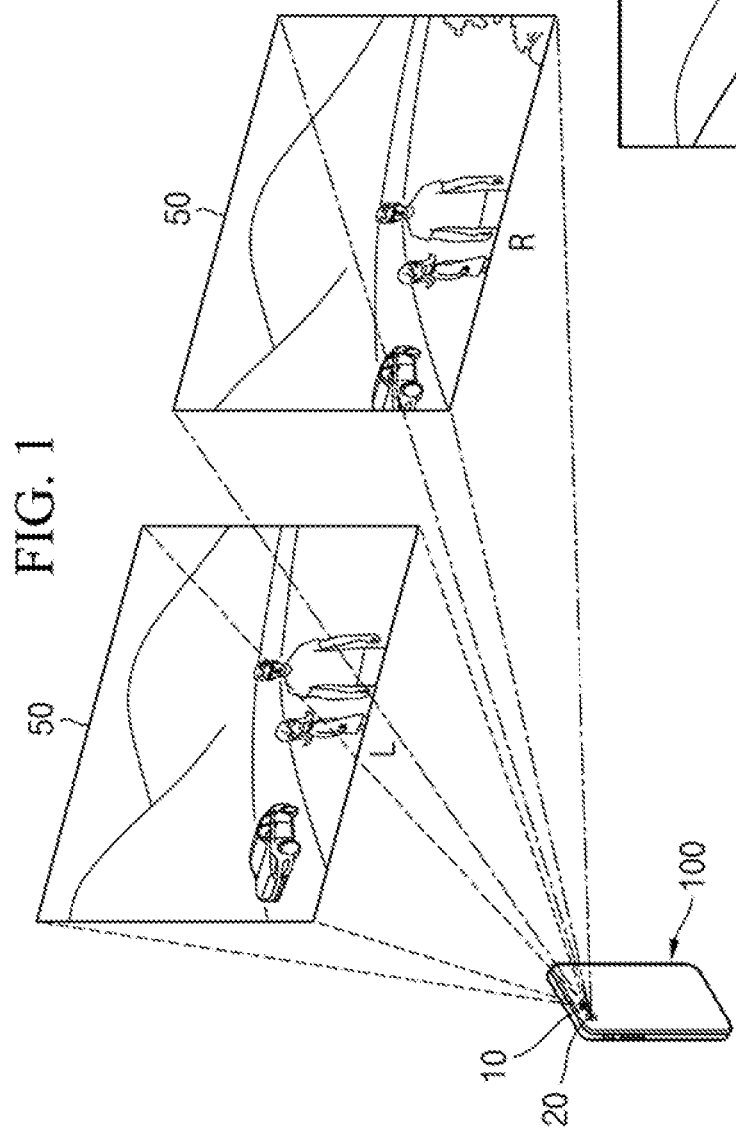
FIG. 1 is a diagram showing different images acquired through a plurality of cameras at different positions by an application processor according to an exemplary embodiment of the present disclosure.
Figure 2:
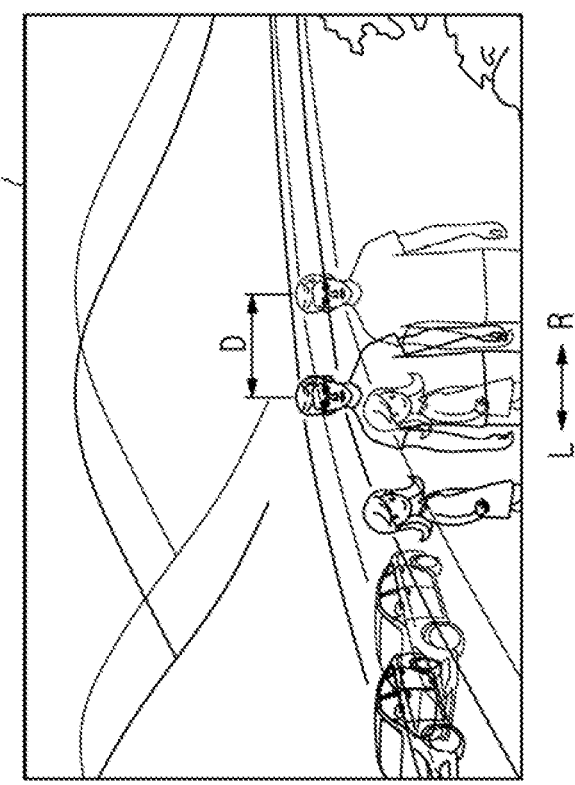
FIG. 2 is a diagram showing a disparity between different images acquired through a plurality of cameras at different positions by an application processor according to an exemplary embodiment of the present disclosure.
Figure 3:
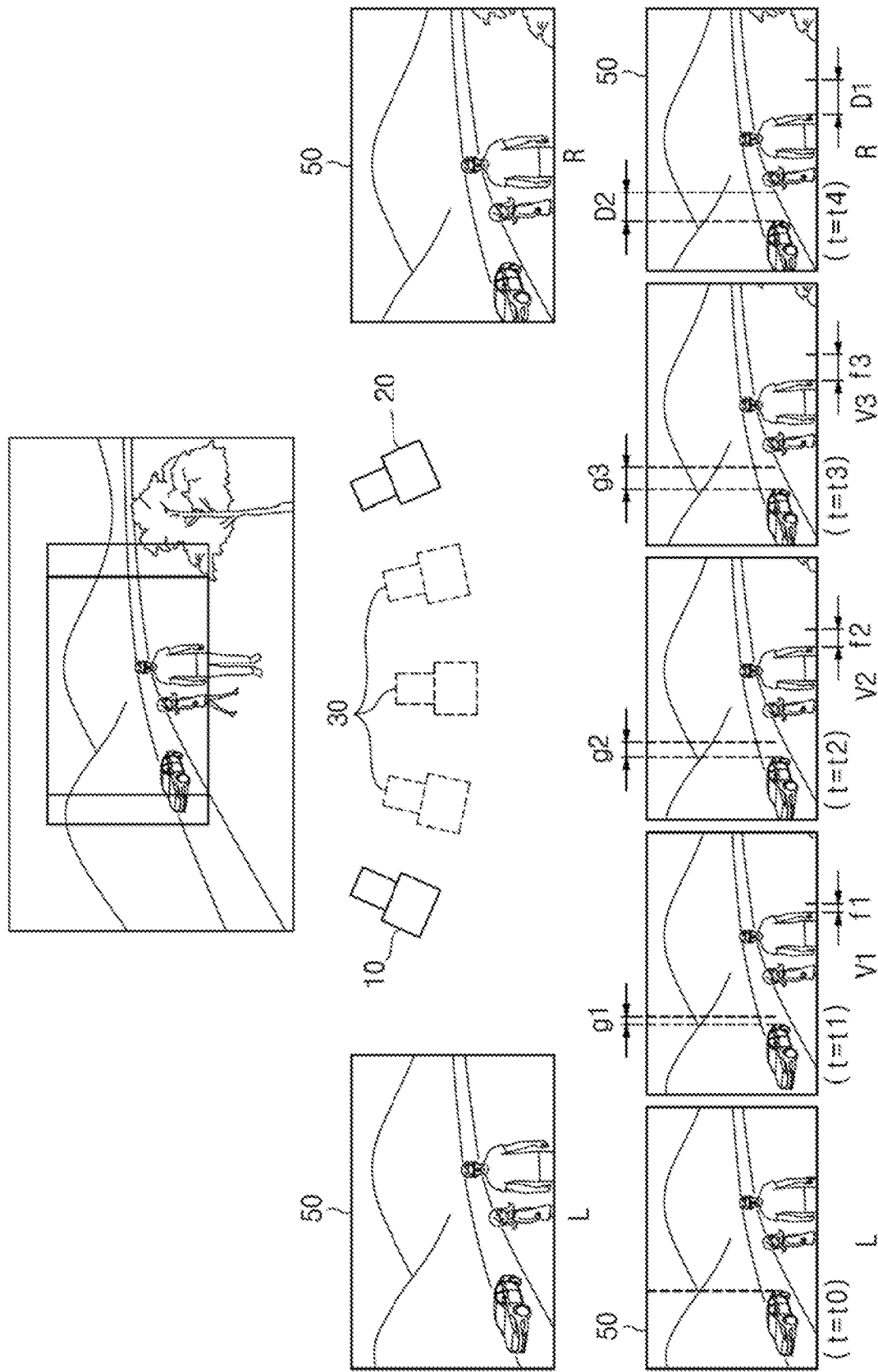
FIG. 3 is a diagram showing that a plurality of images are acquired through a plurality of cameras at different positions by an application processor according to an exemplary embodiment of the present disclosure and illustrating virtual viewpoint images, which may be acquired at positions between the different positions, generated by the application processor.

FIG. 1 is a diagram showing different images acquired through a plurality of cameras at different positions by an apparatus according to an exemplary embodiment of the present disclosure. In this embodiment, two cameras are included in a digital photographing device 100 and may have the same angle of view (field of view). As explained below, the example of FIGS. 1-3 is also applicable to the case in which the two cameras have fields of view that differ from one another, where one of the images is digitally zoomed-in or out with respect to the other so that the resulting images appear to have the same field of view. In either case, the two cameras are a first camera 10 and a second camera 20 and may be disposed at different positions. The first camera 10 acquires a first image at a first position. The second camera 20 acquires a second image at a second position. In the example of FIG. 1, the first camera 10 is a left camera disposed on the rear side surface of the digital photographing device 100, and the second camera 20 is a right camera disposed on the rear side surface. The first image acquired by the first camera 10 is a left image L, and the second image acquired by the second camera 20 is a right image R. The left image L and the right image acquired by the cameras 10 and 20 disposed at the different positions may be different but overlapping images including some of the same objects in a central portion of the images.

FIG. 2 is a diagram showing a disparity between different images acquired through a plurality of cameras at different positions by an application processor according to an exemplary embodiment of the present disclosure.

In FIG. 2, an image displayed on a display 50 is obtained by overlapping the left image L and the right image R of FIG. 1. (Note that the left and right images may not be displayed simultaneously. In this case, FIG. 2 illustrates distances that the objects shift when the display 50 is caused to switch from displaying only the right image R to displaying only the left image L, or vice versa, such as during image capture of a live preview.) In the left image L, objects exist relatively rightward and are illustrated with thin lines. In the right image R, objects exist relatively leftward and illustrated with relatively thick lines. As shown in the drawing, a disparity may be present between identical objects included in the left image L and the right image R. The disparity results from a difference in the position of the object between the left image L and the right image R, according to a distance between the left and right cameras, a distance between the object and the photographing device 100, and a direction of an optical axis between the left camera and the right camera. For instance, the man shown in the image would shift on the display 50 by a distance D. However, other objects in the scene which are closer or further away from device 100 than the man would shift by a different amount between images L and R.

When the digital photographing device 100 receives a user input for switching between the left camera and the right camera, an application processor may generate a camera switching control signal to switch a camera which acquires an output image from the left camera to the right camera, or vice versa. Even when there is no user input, the application processor may generate the camera switching control signal under a set condition. When cameras are switched, an image output on the display 50 may also be switched from the left image L to the right image R or vice versa.

FIG. 3 is a diagram showing a plurality of images acquired through a plurality of cameras at different positions by an application processor according to an exemplary embodiment of the present disclosure. FIG. 3 also shows example virtual viewpoint images, which may be acquired at positions between acquisition positions of the plurality of acquired images, generated by the application processor. As used herein, the phrase "acquiring an image" denotes retrieving or generating an image to be displayed or an image to be used for a virtual viewpoint image synthesis through photography with a camera. Thus, "acquiring an image", when referring to a virtual viewpoint image discussed below, means synthesizing an image using image elements from other images that have been actually captured by at least one camera (typically, images from two respective cameras). "Acquiring an image," when referring to a virtual viewpoint image, may be alternatively phrased herein as "virtually acquiring" the virtual viewpoint image. It is noted that "virtual image" may be used herein interchangeably with "virtual viewpoint image".

As shown in FIG. 3, the digital photographing device 100 may include the first camera 10 and the second camera 20 which have the same angle of view. The first camera 10 is a left camera which acquires a first image L at a first position, and the second camera 20 is a right camera which acquires a second image R at a second position (exemplified as the same images as those in FIG. 1). The left image L and right image R may be images captured substantially simultaneously (simultaneously or in rapid succession). Images L and R may be real time images (live preview or live view images), still image frames of a video, or images captured and stored in the past substantially simultaneously. While each of the cameras 10 and 20 and virtual cameras 30 are illustrated in FIG. 3 as pointing in slightly different directions, they may be arranged to point in the same direction. That is, the cameras 10 and 20 and virtual cameras 30 may have optical axes that are parallel to one another.

According to an exemplary embodiment, third images may be acquired at one or more virtual third positions between the first position and the second position. The third images are virtual viewpoint images that may be acquired by virtual cameras 30 disposed at the third positions. In the illustrated embodiment, the number of virtual viewpoint images V1, V2, and V3 is three. The number of virtual viewpoint images may be determined according to a disparity between the left image L and the right image R, a frame rate (FR) of output images, and a time which is set to output the third images.

An image sequence in which images output on the display 50 by the digital photographing device 100 are temporally output is illustrated. At time t0, the left image L is displayed on a set region (e.g., the entire screen area) of display 50. When a control signal for camera switching from the first camera 10 to the second camera 20 is generated at time t0, the third images which are the plurality of virtual viewpoint images V1, V2, and V3, and the second image which is the right image R may be thereafter output on the same set region of the display 50 in sequence, i.e., at times t1, t2, t3 and t4, respectively. The third images are obtained by synthesizing the left image L and the right image R and may be interpolation images for interpolating the disparity between the left image L and the right image R, a picture-quality difference therebetween, and the like. When the first image, the plurality of third images, and the second image are continuously output in sequence, a visual transition from the first image to the second image may be smoothly performed.

Referring to the image row at the lower end of FIG. 3, the disparity between the left image L and the right image R may vary according to a distance, that is, closeness, between a camera and an object. As shown in the drawing, a disparity of an object relatively close to the first position and the second position may differ from a disparity of an object relatively far thereto. For example, in the shown exemplary embodiment, a disparity amount D1 of a man between the left image L and the right image R is greater than a disparity amount D2 of a car which is farther away than the man from the photographing device 100 (and farther away from the first position and the second position).

A "disparity amount" denotes a total amount of disparity of the same object between the first image and the second image, and an "interpolation amount" denotes a virtual disparity amount that a virtual viewpoint image has with respect to an image which is a basis for disparity compensation.

In FIG. 3, the three virtual viewpoint images V1, V2, and V3 are generated between the left image L and the right image R. The virtual viewpoint images V1, V2, and V3 may be generated by equally dividing a disparity of each object between the left image L and the right image R and interpolating the disparity. The total disparity amount D1 of the man between the left image L and the right image R is assumed to be 100 on the basis of the left image L. A compensated disparity amount f1=25 of the first virtual viewpoint image V1 is 25, and the man who is an object is moved by f1=25 in a direction toward the object in the right image R on the basis of the left image L. A compensated disparity amount of the second virtual viewpoint image V2 is f2=50, and a compensated disparity amount of the third virtual viewpoint image V3 is f3=75.

In the same way, the total disparity amount D2 of the car between the left image L and the right image R is assumed to be 40 on the basis of the left image L. The virtual viewpoint images V1, V2, and V3 are formed so that compensated disparity amounts of the virtual viewpoint images V1, V2, and V3 become g1=10, g2=20, and g3=30, respectively.

Accordingly, between times t0 and t4, by sequentially displaying the virtual viewpoint images V1, V2 and V3 at times t1, t2 and t3, respectively, the resulting display may be an animation in which the objects gradually shift from right to left, thereby avoiding an undesirable jerky effect which would be otherwise seen if image L were to be instantly switched to image R.

As mentioned, the above example of FIGS. 1-3 has been explained with assumption that the two cameras 10 and 20 have the same field of view which may be the case in various applications such as stereoscopy for capturing 3D images. In some cases, the two cameras 10, 20 have different fields of view, which is useful for providing a variety of imaging effects, e.g., background blurring. For instance, camera 10 may be a telephoto camera while camera 20 is a normal or wide angle camera having a wider field of view than camera 10. For instance, if a live preview (a real time image) is captured and displayed with camera 20 and the user inputs commands to gradually zoom in (enlarge) the image, the enlargement is done digitally, not optically. Such digital enlargement may be done using an interpolation technique, but nevertheless may reduce resolution of the central objects in the scene. In an embodiment, if the zoom-in command enlarges the image such that the displayed appearance of field of view equals the optical field of view of camera 10, the device 100 may switch the image on the display to the image captured by camera 10, which generates a higher resolution for the zoomed-in objects. Even though the two cameras 10 and 20 are designed to capture different fields of view, the same or similar disparity as discussed above may exist between a displayed image of camera 10 and a digitally zoomed image of the other camera 20 that results in the appearance of the same field of view as if taken with camera 10 (or vice versa). Thus, to avoid a jerky visual effect at the time of such a switch, the technique as illustrated in FIG. 3, in which a sequence of virtual images is acquired and temporally displayed, may be employed in this scenario as well. Other embodiments involving transitions during zooming operations will be discussed below with reference to FIGS. 7-12.

FIG. 4 is a flowchart of an operating method of a digital photographing device including an application processor according to an exemplary embodiment of the present disclosure. With this method, the digital photographing device 100 may acquire a first image from the first camera 10, acquire a second image from the second camera 20, and output the first image on the display 50. The first camera 10 and the second camera 20 may be disposed at the first position and the second position, respectively, which are different from each other and have the same angle of view (or different angles of view, in the case that one image is digitally zoomed as discussed above). A distance between the first position and the second position causes a disparity between the first image and the second image, and the amount of this disparity may vary according to closeness (perspective) of an object included in the first and second images. The first camera 10 and the second camera 20 may maintain an on-state not only while acquiring images but also at other times.

In operation S110, the digital photographing device 100 may acquire a first image by the first camera 10 at the first position and output the first image on the display 50.

In operation S120, an application processor may generate a control signal for switching from the first camera 10 to the second camera 20. The camera switching control signal may be generated in response to a user input, such as a touch operation, a zooming operation, a gaze, and the like of a user. Even when there is no user input, the camera switching control signal may be generated under a set condition.

In operation S130, a second image may be acquired by the second camera 20 at the second position according to the camera switching control signal of the application processor.

In operation S140, the application processor may generate third images which are virtual viewpoint images between the first image and the second image according to the camera switching control signal. The third images may be virtually acquired at third positions which are a plurality of virtual viewpoints between the first position and the second position. The third images may be composite images generated by synthesizing the first image acquired by the first camera 10 at the first position and the second image acquired by the second camera 20 at the second position. The generated third images may be virtual viewpoint images V for interpolating the disparity between the first image and the second image. The third images generated in operation S140 may be continuously output on the display 50 for a set time. The third images may be generated using interpolation of image elements and interpolating between object positions between the first and second images.

FIG. 5A shows example display images captured respectively by left and right cameras, and corrected images with geometrical corrections made to the captured images. An original left image $L_R$ acquired by the first camera 10 and an original right image $R_R$ acquired by the second camera 20 may be distorted according to attributes of lenses. Distortion of the images may increase from the centers of the images to the edges according to angles of view. The distorted images may be geometrically corrected by warping and the like into a left image L and a right image R. After distortion is corrected, an alignment is performed so that the left image L and the right image R are horizontally aligned on the display 50. In operations subsequent to operation S140, each of the first image and the second image denotes an image in which distortion has been corrected and which has been geometrically corrected in alignment with the other image.

Figure 5B:
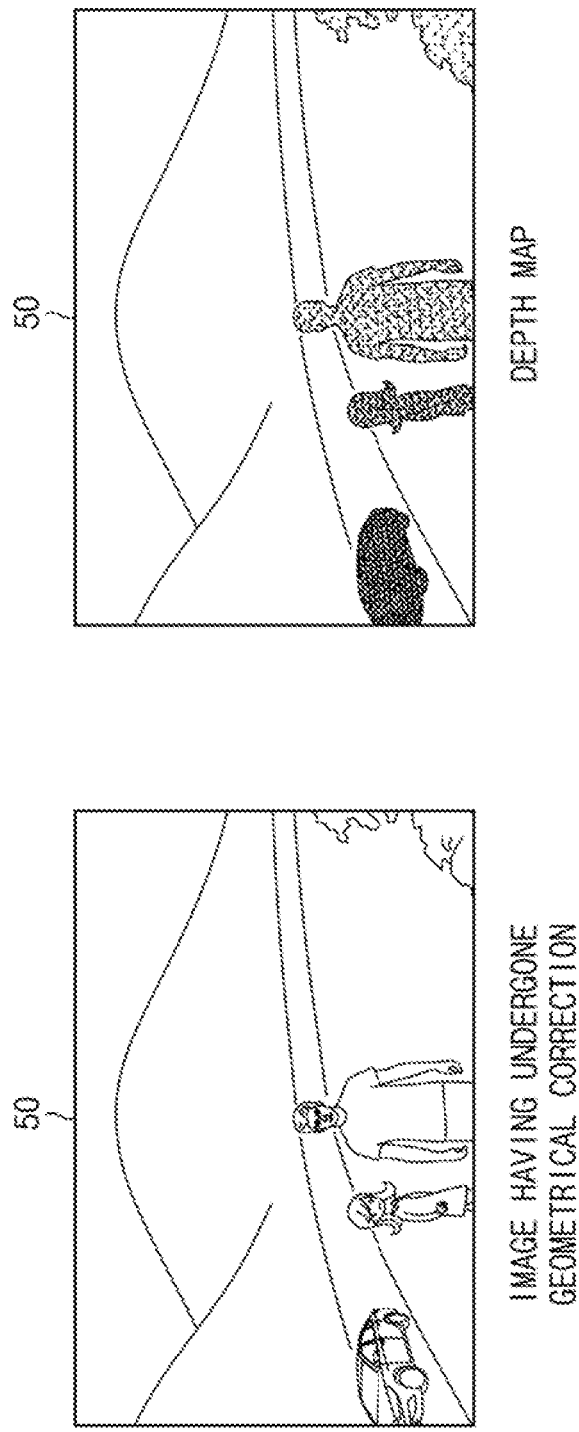
FIG. 5B shows an example corrected display image and a corresponding depth map.

FIG. 5B shows an example corrected display image R and a corresponding depth map. The digital photographing device 100 may generate a disparity map in which the disparity between the first image and the second image acquired by the first camera 10 and the second camera 20 is shown. On the basis of the generated disparity map, a depth map which shows closeness of objects to device 100 may be generated. In the shown depth map, lightly shaded objects are relatively closer to device 100 than darker shaded objects. The disparity of the disparity map is in inverse proportion to a depth of the depth map.

It is possible to generate the one or more virtual viewpoint images V by equally or differently compensating for the disparity between the first image and the second image acquired from the generated disparity map or depth map. The generated virtual viewpoint images V may be sequentially and continuously output in order of an image which has been compensated for a minimum disparity with respect to the first image, which is a pre-transition image, to an image which has been compensated for a maximum disparity.

In operation S150, after all the virtual viewpoint images V are output, the second image acquired by the second camera 20 at the second position may be output. Since the virtual viewpoint images V for compensating for the disparity are sequentially and continuously output between the first image and the second image before the second image is output, it is possible to remove a jerky image effect caused by camera switching and make a smooth image transition.

Figure 6A:
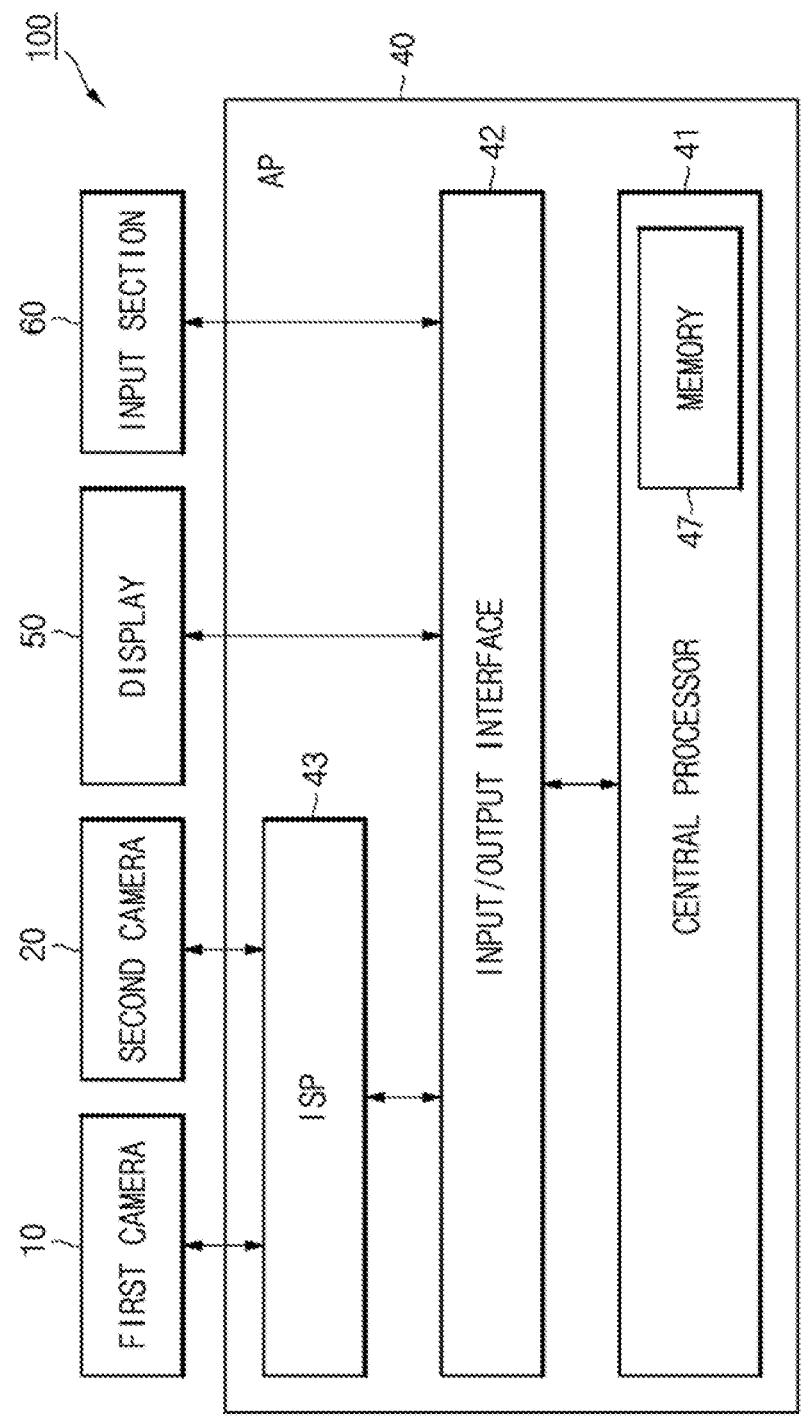
FIG. 6A is a block diagram of a digital photographing device according to an exemplary embodiment of the present disclosure.
Figure 6B:
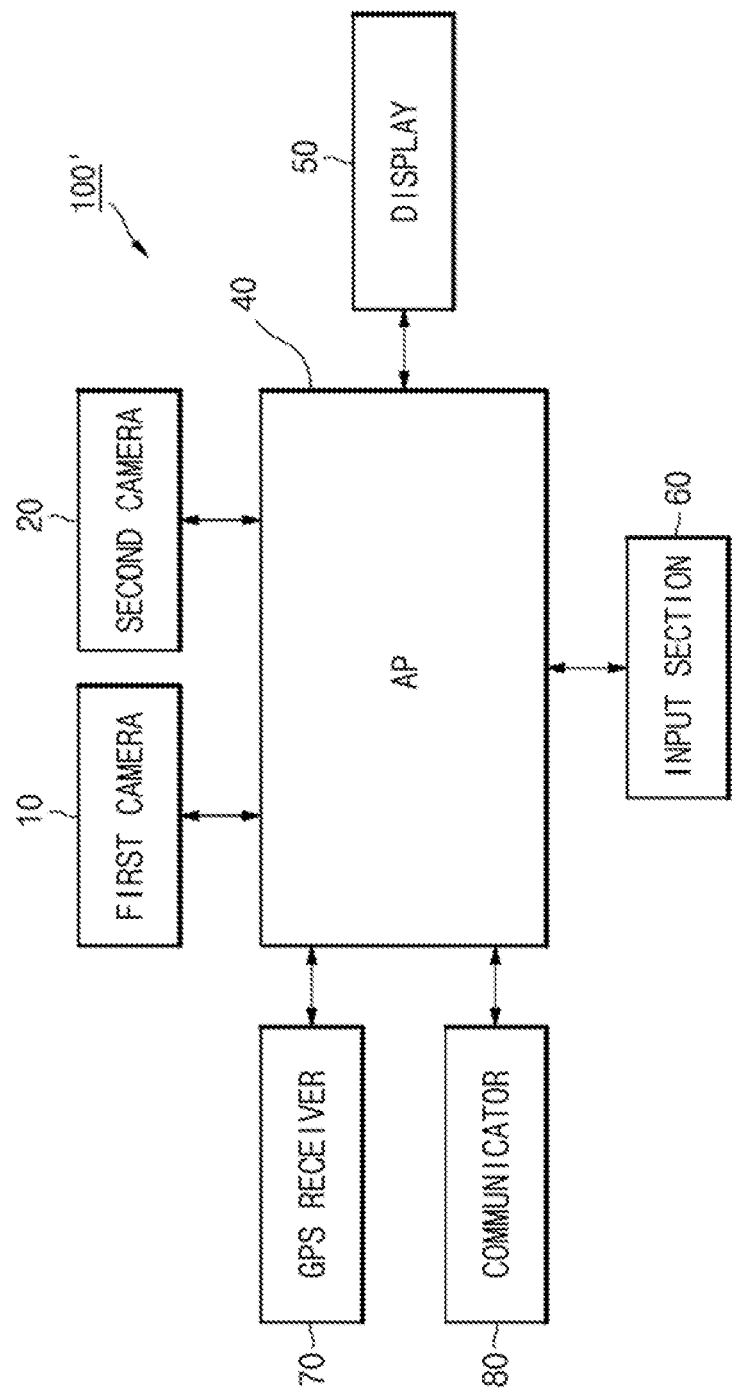
FIG. 6B is a block diagram of a digital photographing device according to another embodiment.

FIG. 6A is a block diagram of a digital photographing device 100 according to an exemplary embodiment. Device 100 may include the first camera 10, the second camera 20, an application processor (AP) 40, the display 50, and an input section 60. Application processor 40 may be connected to the first camera 10, the second camera 20, the display 50, the input section 60, and the like through an input/output interface 42 and control these peripherals. As illustrated in FIG. 6B, digital photographing device 100' differs from device 100 by further including a global positioning system (GPS) receiver 70 and a communicator 80, which may also be connected to and controlled by AP 40.

According to an exemplary embodiment, each of the first camera 10 and the second camera 20 may include at least one lens and an image sensor (not shown). A CCD image sensor or a CMOS image sensor may be used as the image sensor. The first camera 10 and the second camera 20 may have identical or different angles of view. For example, a wide-angle camera and a telephoto camera having different angles of view may be used in combination. Herein, "telephoto camera" is used as a relative term to denote a camera with a telephoto lens or other lens configuration that provides a narrower field of view than a wide angle camera. "Telephoto camera," as used herein, does not require a long focal length or any particular focal length lens. Similarly, "telephoto image" does not imply an image taken with a lens of any particular focal length.

According to an exemplary embodiment, one or more of the plurality of cameras provided in the digital photographing device 100 may be moved with respect to the digital photographing device 100. For example, when the digital photographing device 100 includes a telephoto camera, the telephoto camera may be moved to photograph a target region which is changed according to an input of a user. The telephoto camera may be configured to be moved up, down, left, and right, or tilted using a piezo motor or the like.

Images acquired by the first camera 10 and the second camera 20 may be processed by an image signal processor (ISP) 43 and then transmitted to a central processor 41 of the application processor 40. The number of ISPs 43 may correspond to the number of cameras so that the ISPs 43 are individually connected to the cameras 10 and 20. It is possible to acquire a clear image by controlling a focus, an exposure, and a white balance of an image acquired from each of the cameras 10 and 20 through the ISP 43. An image signal which has undergone image signal processing may be transmitted to the central processor 41. In the exemplary embodiment of FIG. 6A, the ISP 43 is included in the application processor 40. In one embodiment, ISP 43 may be provided in between the application processor 40 and each of the cameras 10 and 20 or may be embedded in each of the cameras 10 and 20.

The display 50 may be connected to the application processor 40 and may receive output image data and an output signal from the central processor 41 and output the image. The output image may be a live view image which shows an image received from a camera in real time.

The input section 60 may be connected to the application processor 40 and may receive a user input and transfer the received user input to the central processor 41. The input section 60 may include, for example, a touch screen, a motion recognition sensor, a tactile sensor, and a gaze detection sensor. The user input acquired through the input section 60 may be transferred to the central processor 41.

The application processor 40 may include the central processor 41 which controls peripherals, such as a camera and the like, and the input/output interface 42 which connects the peripherals and the central processor 41. AP 40, GPS receiver 70 and communicator 80 may be arranged on part of the same integrated circuit, or disposed on different respective integrated circuits.

The input/output interface 42 may receive an input from the peripherals and transmit an output from the central processor 41.

The central processor 41 may generate a camera switching control signal, generate a virtual viewpoint image, and control the virtual viewpoint image to be output on the display 50.

According to an exemplary embodiment, the central processor 41 may be implemented as a combination of a processing unit, such as a central processing unit (CPU), a graphics processing unit (GPU), a general-purpose GPU (GPGPU), and the like, and a non-transitory memory 47 in which a program is stored, or may be implemented as another form of hardware. The central processor 41 may execute a camera switching program stored in the memory 47 or additionally include an image generator for camera switching, such as a digital signal processor (ISP). Alternatively, memory 47 is external of central processor 41 and is connected to the processing unit of central processor 41 through a bus (not shown). The central processor 41 may be connected to the display 50 and may transmit output image data and an output command to the display 50 so that image signals input from the cameras 10 and 20 or generated virtual viewpoint images are output.

Referring to FIG. 6A, the central processor 41 may generate a virtual viewpoint image V. The generated virtual viewpoint image V may be output on the display 50 according to an output command of the central processor 41.

According to an exemplary embodiment, the central processor 41 may generate the camera switching control signal when a command for switching cameras is input from a user or a set condition is satisfied. When the central processor 41 includes a CPU, the CPU may generate the virtual viewpoint image V using the camera switching program stored in the memory 47. The central processor 41 may include the image generator for camera switching as additional hardware. The image generator for camera switching is hardware dedicated to generating a camera switching image and may be a DSP. When the additional image generator for camera switching is provided, it is possible to attain a desired speed of image transition processing by increasing a transition speed of output images.

According to an exemplary embodiment, the image generator for camera switching may include a geometry corrector, a disparity map generator, and a virtual viewpoint image generator.

The geometry corrector may perform a distortion correction or image rectification. As mentioned with reference to FIG. 5A, distortion of an image which is acquired from a camera and undergoes image signal processing may be processed in a geometrical correction method, such as warping. After the distortion correction, a correction may be made so that the images acquired by the plurality of cameras 10 and 20 are aligned with each other (horizontally).

The disparity map generator may generate a disparity map showing a disparity between the images which have been geometrically corrected. Referring to FIG. 5B, a depth map may be generated using semi-global matching (SGM) between the left image L and the right image R. As another method of generating a depth map, a block matching technique, a belief propagation algorithm, a deep learning-based method, and the like may be used. Since a disparity is in inverse proportion to a distance (depth) between an object and a photography location, an object closer to the photography location is displayed with a greater disparity.

The virtual viewpoint image generator may generate one or more virtual viewpoint images V between the left image L and the right image R. The virtual viewpoint image generator may determine a number N of virtual viewpoint images to be generated on the basis of a greatest disparity which is determined in the disparity map or the depth map. As shown in the image sequence of FIG. 3, each of the generated virtual viewpoint images may be referred to as a $N^{th}$ virtual viewpoint image VN in order of smaller disparity with respect to the first image (the left image L). The generated virtual viewpoint images may be stored in an internal memory.

Any one or more of functions of the geometry corrector and the disparity map generator may be performed through external dedicated hardware connected to the application processor 40.

Figure 8:
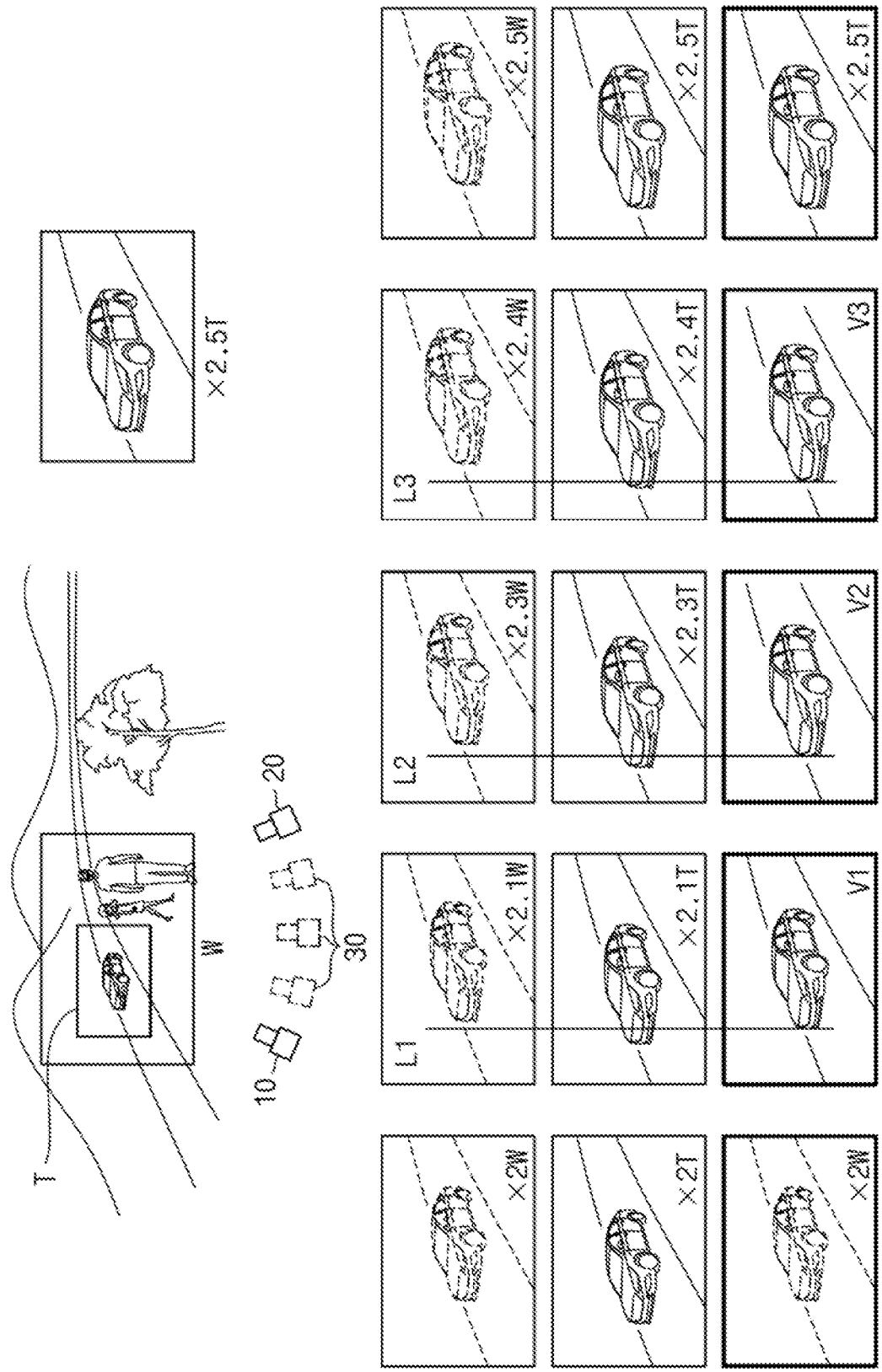
FIG. 8 is a diagram showing different images acquired through a plurality of cameras having different angles of view at different positions by an application processor according to an exemplary embodiment of the present disclosure and showing virtual viewpoint images generated as interpolation images between the acquired different images.

FIG. 7 is a diagram showing a picture-quality difference and a disparity between different images acquired through a plurality of cameras having different angles of view at different positions due to a zoom input by a digital photographing device. FIG. 8 is a diagram showing different images acquired through a plurality of cameras having different angles of view at different positions by a digital photographing device according to an exemplary embodiment of the present disclosure and showing virtual viewpoint images generated as interpolation images between the acquired different images.

In FIGS. 7 and 8 it is assumed that images are captured with digital photographing device 100 having two cameras with different angles of view. The two cameras are the first camera 10 and the second camera 20 and may be disposed at different positions. The first camera 10 acquires a first image at a first position. The second camera 20 acquires a second image at a second position.

Referring to FIG. 7, the first image acquired at the first position from the first camera 10 which is a wide-angle camera may be a wide-angle image W, and the second image acquired at the second position from the second camera 20 which is a telephoto camera may be a telephoto image T. (The legend ×3T denotes that the image T is a 3× enlarged version of the wide-angle image W.) When a camera switching signal to the telephoto camera is input to the digital photographing device 100 while the wide-angle image W is being output on the display 50, a camera switching control signal is generated by the central processor 41. An image output on the display 50 may be switched by the camera switching control signal from the wide-angle image W to the telephoto image T by sequentially displaying virtual viewpoint images V before image T. A camera switching input of a user may be a zooming operation, where zooming capability may include zoom in and zoom out.

Examples of the camera switching control signal include a zoom signal and the camera switching signal. Zooming and camera switching may be performed in the digital photographing device 100 according to information of a zoom factor included in the zoom signal.

In the exemplary embodiment shown in FIG. 7, when a user performs a zooming operation on a target region Z that be or she wants to magnify (zoom in) while the wide-angle image W is being output, the wide-angle image W may be magnified according to an input zoom factor signal on the basis of the target region Z. As shown in FIG. 7, the wide-angle image W may be magnified centering on the target region Z by 1.7 times (×1.7), 2.5 times (×2.5), and 3 times (×3) digital zooming according to the zoom factor signal included in the camera switching input of the user. When a default zoom factor of the telephoto camera is three times, the wide-angle image W may be set to be magnified up to only 3 times by digital zooming and output. Since a wide-angle image W magnified by digital zooming has a low resolution, picture quality may be degraded (indicated by dotted lines). When a zoom factor signal of greater than 3 time is generated, cameras are switched, and a telephoto image T to which the input zoom factor is applied may be acquired through the telephoto camera and output.

A wide-angle image W and a telephoto image T to which the same zoom factor is applied may be, for example, a 3-times magnified wide-angle image (×3W) and 3-times magnified telephoto image (×3T) of FIG. 7. These two images may have a disparity due to a distance between the wide-angle camera and the telephoto camera. When digital zoom is applied to a wide-angle image, picture quality may be degraded compared to a telephoto image. In the case of a transition from a 3-times magnified wide-angle image to a 3-times magnified telephoto image (×3W→×3T), if the transition is instantaneous and no correction is implemented, such a disparity and a picture-quality difference may result in an undesirable jerky effect which is annoying to a user.

Referring to FIG. 8, a process of switching cameras from the first camera 10 to the second camera 20 by a zooming operation of a user will be described. The first camera 10 may be a wide-angle camera, and the second camera 20 may be a telephoto camera. While a wide-angle image W captured by the wide-angle camera is being output on the display 50, a zooming operation of a user may be input to the digital photographing device 100. As shown in FIG. 7, the target region Z to be zoomed may be designated by a user input, and objects included in the target region Z may be magnified or demagnified by digital zooming. When a zoom input exceeding a threshold zoom factor is received, the digital photographing device 100 may switch a means of capturing and outputting an image to the telephoto camera and output an image.

In the example of FIG. 8, a zooming operation is caused by a zoom-in input, an input zoom factor is 2.5 times, and a default zoom factor of the telephoto camera is 2 times. When a user designates a target region Z in the wide-angle image W and performs a 2.5-times zoom-in operation therein while the wide-angle image W is being output on the display 50, the wide-angle image W may be magnified by digital zooming according to the user input. Although not shown in the drawing, the wide-angle image W is magnified by digital zooming and output according to an input zoom factor from ×1 which is a default ZOOM factor of the wide-angle camera to ×2 which is a default zoom factor of the telephoto camera. When a zoom factor signal of the zooming operation exceeds ×2 and the wide-angle camera is switched to the telephoto camera, a disparity and a picture-quality difference may occur, like in FIG. 7. To avoid this, digital photographing device 100 may generate and output one of more virtual viewpoint images V at a time point of a transition from the wide-angle image W to the telephoto image T. The virtual viewpoint images V may be interpolation images for interpolating the disparity and the picture-quality difference between the wide-angle image W and the telephoto image T. The virtual viewpoint images V may be set to be generated at ×2 which is the default zoom factor of the telephoto camera to ×2.5 which is a set transition range. In an example hereafter, ×2 will be referred to as a minimum zoom factor (a first zoom factor), ×2.5 will be referred to as a maximum zoom factor (a second zoom factor), and a range from ×2 to ×2.5 will be referred to as a switchover region.

In FIG. 8, a first image row in the lower portion thereof shows wide-angle images (×W) of ×2, ×2.1, ×2.3, ×2.4, and ×2.5 acquired by the wide-angle camera. A second image row shows telephoto images (×T) of ×2, ×2.1, ×2.3, ×2.4, and ×2.5 acquired by the telephoto camera. A third image row shows images output on the display 50 in a temporal sequence. In the third image row, the 2-times magnified wide-angle image (×2W) is output first, and the 2.5-times magnified telephoto image (×2.5T) is output last. In the switchover region between ×2 and ×2.5, the virtual viewpoint images V are generated and output. Images output between the 2-times magnified wide-angle image (×2W) and the 2.5-times magnified telephoto image (×2.5T) are virtual viewpoint images V1, V2, and V3. Each of the virtual viewpoint images V1, V2, and V3 may be generated by interpolating a picture quality and a disparity between a wide-angle image (×W) and a telephoto image (×T) to which the same zoom factor between ×2 and ×2.5, which is the switchover region, has been applied. For interpolation, a disparity and a picture-quality difference may be determined on the basis of any one of the both images (×W and ×T), and interpolation may be performed on the basis of an image of a closer zoom factor between the minimum zoom factor and the maximum zoom factor.

For example, the virtual viewpoint image V1 may be generated by synthesizing the 2.1-times magnified wide-angle image (×2.1W) and the 2.1-times magnified telephoto image (×2.1T). Since a zoom factor ×2.1 of the virtual viewpoint image V1 is close to ×2 which is the minimum zoom factor, the 2.1-times magnified wide-angle image (×2.1W) and the 2.1-times magnified telephoto image (×2.1T) may be synthesized to compensate for a picture quality and a disparity on the basis of the 2.1-times magnified wide-angle image (×2.1W). In the shown example, the virtual viewpoint image V1 has been interpolated to have a minimum disparity amount with respect to the 2.1-times magnified wide-angle image (×2.1W) between the 2.1-times magnified wide-angle image (×2.1W) and the 2.1-times magnified telephoto image (×2.1T). A left-end reference line L1 of a car in the virtual viewpoint image V1 is close to the 2.1-times magnified wide-angle image (×2.1W). On the other hand, the virtual viewpoint image V3 has been interpolated to have a minimum disparity amount with respect to the 2.4-times magnified telephoto image (×2.4T). A left-end reference line L2 of the virtual viewpoint image V2 is located on the basis of centers of the wide-angle image (×W) and the telephoto image (×T) to which the same zoom factor is applied, and a left-end reference line L3 of the virtual viewpoint image V3 is close to the 2.4-times magnified telephoto image (×2.4T). Interpolation may be performed by equally dividing picture-quality differences and disparity amounts between the virtual viewpoint images V or on another basis.

To generate the virtual viewpoint images V1, V2, and V3 of FIG. 8, picture quality may be interpolated on the basis of a telephoto image (×T) with a high resolution.

Referring again to FIG. 3, when a target region includes a plurality of objects, the objects may have different disparities. Therefore, the objects in each virtual viewpoint image may have different interpolated disparity amounts.

Referring to the lowest image row of FIG. 8, which represents an output image temporal sequence, when the user performs a zoom-in operation, the wide-angle image may be magnified/demagnified to the minimum zoom factor of the switchover region by digital zooming, and output. When a zoom factor greater than the minimum zoom factor of the switchover region is input, the virtual viewpoint images V may be generated by synthesizing a wide-angle image (×W) magnified by digital zooming and a telephoto image (×T) magnified by optical zooming, and may be output in sequence. When a zoom factor greater than the maximum zoom factor of the switchover region is input, a telephoto image (×T) to which the input zoom factor has been applied may be output. Since the virtual viewpoint images V are sequentially output in the switchover region, the disparity and the picture-quality difference between the pre-transition image and the post-transition image are interpolated, and thus a smooth output image transition is possible.

Figure 9:
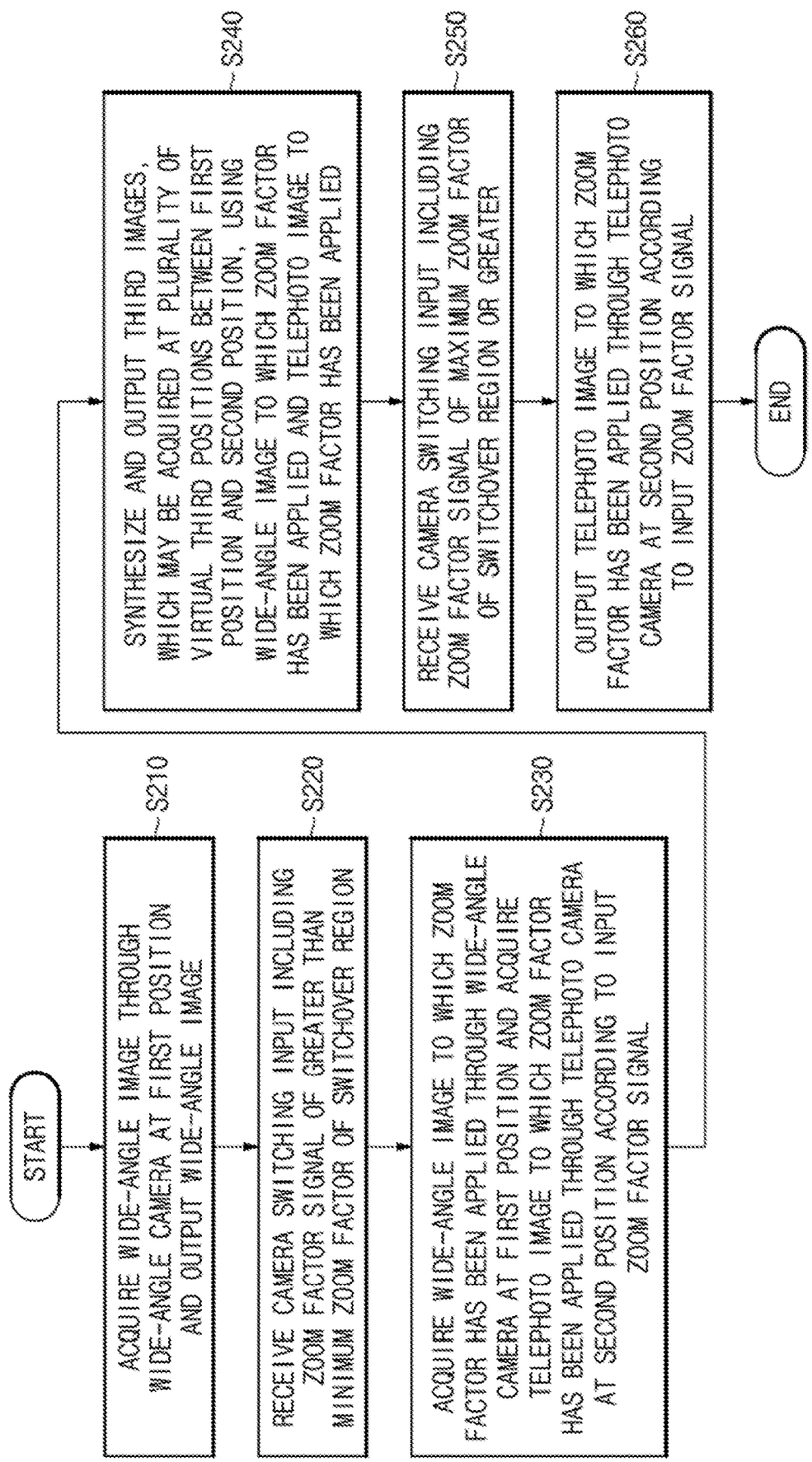
FIG. 9 is a flowchart of an operating method of a digital photographing device that zooms-in on a displayed image, beginning with a wide-angle image acquisition by a wide-angle camera.

FIG. 9 is a flowchart of an operating method of a digital photographing device including an application processor according to an exemplary embodiment of the present disclosure. In this method, digital photographing device 100 may acquire a first image from the first camera 10, acquire a second image from the second camera 20, and output the first image on the display 50. The first camera 10 and the second camera 20 may be disposed at a first position and a second position which are different positions and may have different angles of view (fields of view). A distance between the first position and the second position causes a disparity between the first image and the second image, and a resolution may vary according to an angle of view and a zoom factor.

In the exemplary method of FIG. 9, the first camera 10 is a wide-angle camera, and the first image is a wide-angle image. The second camera 20 is a telephoto camera, and the second image is a telephoto image. A camera switching input of a user may be a camera switching signal or a zoom factor signal. A zoom factor section in which a virtual viewpoint image is generated and output before a transition from the first image to the second image is referred to as a switchover region having a maximum zoom factor and a minimum zoom factor.

In operation S210, the digital photographing device 100 may acquire a wide-angle image W from the wide-angle camera at the first position and output the wide-angle image W on the display 50 until a minimum zoom factor signal of the switchover region is input. For example, when the minimum zoom factor is ×2 and a zoom factor of ×2 or less is input, a wide-angle image (×W) to which the input zoom factor has been applied may be acquired by the wide-angle camera and output.

In operation S220, the digital photographing device 100 may receive a user input for starting camera switching. The user input may be a zooming operation including a zoom factor signal exceeding the minimum zoom factor of the switchover region. For example, the user may perform the zooming operation on a target region including an object to be magnified on the display 50 which is a touch screen. In response to the user input, the central processor 41 of the application processor 40 may generate a camera switching control signal so that a virtual viewpoint image may be generated and output on the display 50. When the zoom factor input by the user is continuously changed, operations subsequent to S230 may be set to be prepared in advance. For example, when the user performs a zoom-in operation at a 1-time magnified wide-angle image (×1W) and an input zoom factor is sensed to increase toward the minimum zoom factor of the switchover region, operations subsequent to S230 may be set to be prepared in advance even if the input zoom factor is not included in the switchover region.

In operation S230, according to the zoom factor signal input in operation S220, the digital photographing device 100 may acquire a wide-angle image (×W, a first zoom image) to which the zoom factor has been applied through the wide-angle camera at the first position and acquire a telephoto image a second zoom image) to which the zoom factor has been applied through the telephoto camera at the second position. The telephoto camera may be moved with respect to the digital photographing device 100 to photograph the target region designated by the zooming operation of the user. For example, a wide-angle image (×W) to which a zoom factor exceeding the minimum zoom factor has been applied may be acquired by digital zooming of the wide-angle camera. A telephoto image (×T) to which the same zoom factor as that of the wide-angle image (×W) has been applied may be acquired by optical zooming of the telephoto camera.

In operation S240, virtual viewpoint images V (third images) which may be acquired at a plurality of virtual third positions between the first position and the second position may be generated by synthesizing the wide-angle image (×W) and the telephoto image (×T) to which the zoom factor has been applied and output on the display 50. The virtual viewpoint images V may be generated by geometrically correcting the wide-angle image (×W) and the telephoto image (×T), generating a disparity map from the corrected images, and then synthesizing the two images (×W and ×T) to compensate for a disparity. When there is a great disparity between the wide-angle image (×W) and the telephoto image (×T), the number of generated virtual viewpoint images may be increased. The virtual viewpoint images may be output in order of an image compensated to be close to the wide-angle image (×W), which is a pre-transition image and to which the minimum zoom factor has been applied, to an image compensated to be close to the telephoto image (×T), which is a post-transition image and to which the maximum zoom factor has been applied. An image compensated to be close to another image denotes that the image has been compensated to have a small zoom factor difference and a small disparity with respect to the other image which is the reference of compensation. Referring to FIG. 8, the virtual viewpoint image is an image to which a zoom factor of ×2.1 has been applied. Since the zoom factor of ×2.1 is closer to ×2 which is the minimum zoom factor than ×2.5 which is the maximum zoom factor, the virtual viewpoint image V1 may be compensated to have a smaller disparity with respect to a wide-angle image output at the minimum zoom factor or less. For example, as shown in FIG. 8, the 2.1-times magnified virtual viewpoint image V1 may be compensated for a disparity to have a smaller disparity with respect to the 2.1-times magnified wide-angle image (×2.1W) than the 2.1-times magnified telephoto image (×2.1T).

In operation S250, the digital photographing device 100 may receive a user input for ending the camera switching. The user input may be a zooming operation including a zoom factor signal of the maximum zoom factor of the switchover region or greater. For example, when the maximum zoom factor is ×2.5 and a zoom factor of ×2.5 or greater is input, a telephoto image (×T) to which the input zoom factor has been applied may be acquired by the telephoto camera and output.

In operation S260, the digital photographing device 100 may output a telephoto image to which the input zoom factor has been applied through the telephoto camera at the second position according to the input zoom factor signal.

When an output image is switched from the wide-angle image to the telephoto image according to the input zoom factor, the virtual viewpoint images compensated for a zoom factor and a disparity are generated and output, and thus it is possible to prevent an abrupt change in the size and position of an object included in images output on the display.

Figure 10:
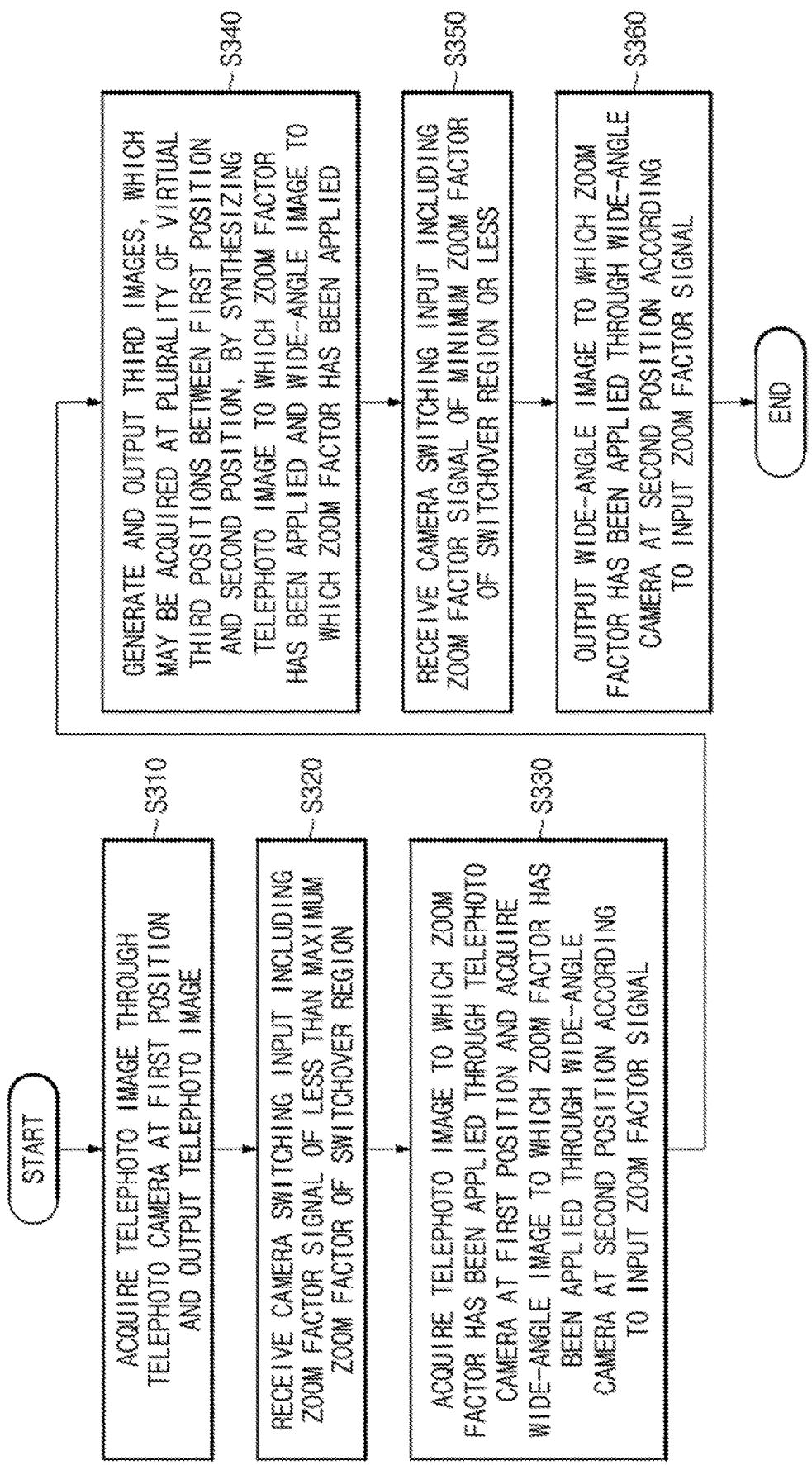
FIG. 10 is a flowchart of an operating method of a digital photographing device that zooms-out on a displayed image, beginning with a telephoto image acquisition by a telephoto camera.

FIG. 10 is a flowchart of an operating method of a digital photographing device including an application processor according to an exemplary embodiment of the present disclosure.

In the exemplary embodiment of FIG. 10, the first camera 10 is a telephoto camera and acquires a telephoto image T, and the second camera 20 is a wide-angle camera and acquires a wide-angle image W. While the zooming operation in the exemplary embodiment of FIG. 9 is a zoom-in operation, a zooming operation in the exemplary embodiment of FIG. 10 is a zoom-out operation. Other configurations are the same as in the exemplary embodiment of FIG. 9.

In operation S310, the digital photographing device 100 may acquire the telephoto image T from the telephoto camera at a first position and output the acquired telephoto image T on the display 50 until a maximum zoom factor signal of a switchover region is input. For example, when the maximum zoom factor is ×2.5 and a zoom factor of ×2.5 or greater is input, a telephoto image (×T) to which the input zoom factor has been applied may be acquired by the telephoto camera and output.

In operation S320, the digital photographing device 100 may receive a user input for starting camera switching. The user input may include a zoom factor signal of less than the maximum zoom factor of the switchover region.

In operation S330, according to the zoom factor signal input in operation S320, the digital photographing device 100 may acquire a telephoto image (×T) to which the zoom factor has been applied through the telephoto camera at the first position and acquire a wide-angle image (×W) to which the zoom factor has been applied through the wide-angle camera at a second position.

In operation S340, the digital photographing device 100 may generate virtual viewpoint images V (third images) which may be acquired at a plurality of virtual third positions between the first position and the second position by synthesizing the wide-angle image (×W) and the telephoto image (×T) to which the zoom factor has been applied and may output the generated virtual viewpoint images V on the display 50.

In operation S350, the digital photographing device 100 may receive a user input for ending the camera switching. The user input may be a zooming operation including a zoom factor signal of the minimum zoom factor of the switchover region or less.

In operation S360, the digital photographing device 100 may output a wide-angle image to which the input zoom factor has been applied through the wide-angle camera at the second position according to the input zoom factor signal.

Figure 11:
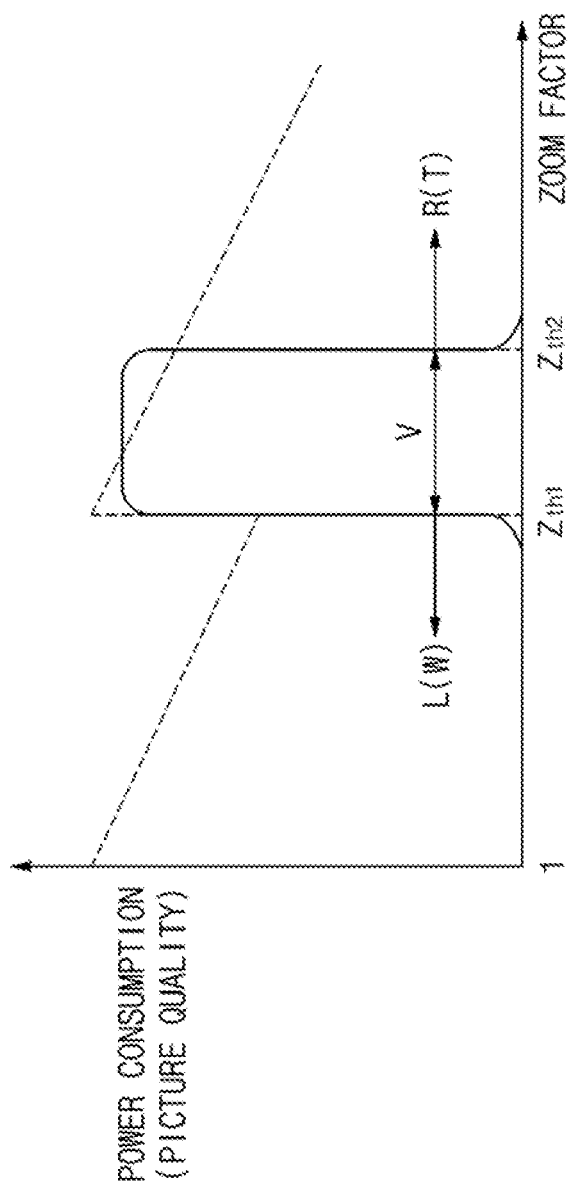
FIG. 11 is a diagram showing a change in the picture quality of a displayed image and power consumption when an application processor according to an exemplary embodiment of the present disclosure switches cameras according to a zoom input.

FIG. 11 is a diagram showing a change in the picture quality of displayed images and power consumption when the application processor 40 according to an exemplary embodiment of the present disclosure switches cameras according to a zoom input.

According to an exemplary embodiment, the digital photographing device 100 may have a wide-angle camera and a telephoto camera, and there is a disparity between a wide-angle image W and a telephoto image T according to a distance between the cameras. When a zoom-in request is input by a user while the wide-angle image W is being output, the wide-angle image W is magnified by digital zooming. A camera which acquires an output image may be switched between the wide-angle camera and the telephoto camera according to a user input and a setting for camera switching.

Referring to FIG. 11, an image which is magnified by software-based processing, such as digital zooming, involves picture quality degradation according to a zoom factor. Since the telephoto camera performs optical zooming, picture quality is barely degraded. When the cameras are switched, a picture quality (resolution) difference between images acquired through the cameras before and after the switchover is revealed and may be discomforting to the user. According to an exemplary embodiment of the present disclosure, when the cameras are switched, a certain zoom factor region including a default zoom factor of the telephoto camera is set as a switchover region, and a virtual viewpoint image is generated and output in the switchover region, so that user discomfort caused by the camera switching may be reduced or eliminated.

For example, ×2 which is the default zoom factor of the telephoto camera may be set as a minimum zoom factor $Z_{th1}$ of the switchover region, and ×2.5 which is a random zoom factor may be set as a maximum zoom factor $Z_{th2}$ of the switchover region. When a zoom factor outside the switchover region is input, a telephoto image or a wide-angle image to which the input zoom factor has been applied is acquired by magnifying a telephoto image or demagnifying a wide-angle image and output, and the cameras are not switched. When a camera switching input of a user includes a zoom factor signal within the switchover region, it is possible to determine whether to magnify or demagnify an image currently being output and whether to switch the cameras according to a camera of the image and the input zoom factor signal.

When the cameras are switched, a virtual viewpoint image V is generated and output in the switchover region, which consumes additional power. A zoom input by the user may involve performing a zooming operation for a certain time and continuously repeating the operation. A zoom factor signal input by a zoom input operation of the user may be maintained within the switchover region for a long time. In this case, the digital photographing device 100 continuously generates and outputs the virtual viewpoint image V, consuming more power. When the zoom input of the user is included the switchover region for a certain time or more, the digital photographing device 100 may be set so that any one of the wide-angle camera and the telephoto camera may be selected.

For example, when the minimum zoom factor $Z_{th1}$ is ×2 and the maximum zoom factor $Z_{th2}$ is ×2.5 in the exemplary embodiment of FIG. 11, a zoom input of the user may be ×2.3. When a camera before switchover is the wide-angle camera, the virtual viewpoint image V is set to be generated at the input of ×2.3 which is less than ×2.5. At this time, according to a setting, when the input of ×2.3 lasts for five seconds or more, the digital photographing device 100 may automatically switch to the telephoto camera even without a change in the input zoom factor. On the other hand, when a camera before switchover is the telephoto camera and an input of ×2.4 lasts for five seconds or more, the digital photographing device 100 may automatically switch to the wide-angle camera. The same method may be applied to a left image L and a right image R acquired by a left camera and a right camera having the same angle of view.

When cameras are automatically switched, an input signal of the user may be set not to be transferred to the central processor any more. In this case, the user may perform a new multi-touch operation to input a zoom signal again. In this way, by setting cameras to be automatically switched when an input signal is maintained within the switchover region for a relatively long time, it is possible to prevent excessive power consumption.

As another method for reducing power consumption in the switchover region, a frame rate (FR) may be adjusted. According to a setting, an FR may be lowered over the entire switchover region or may be differentially adjusted depending on a zoom factor.

FIG. 12 is a diagram showing camera switching and augmented information providing operations of a digital photographing device according to an exemplary embodiment of the present disclosure. Digital photographing device 100 described hereinabove may be employed within an electronic system. The electronic system may be an augmented reality (AR) system and may be used for a location information providing service, an on-road driving support service, a parking support service, and the like. An image output on a display of the digital photographing device 100 may include augmented information.

According to an exemplary embodiment, the digital photographing device 100 includes a wide-angle camera and a telephoto camera and acquires a wide-angle-image W and a telephoto image T from the wide-angle camera and the telephoto camera, respectively. When a camera switching input is received from a user while the wide-angle image W is being output, the digital photographing device 100 may generate and output a virtual viewpoint image V and then output the telephoto image T acquired from the telephoto camera.

Referring to FIG. 12, the digital photographing device 100 may be used in a system for providing information in real time using AR. While the wide-angle image W is being output during on-road driving or a walk, the user may input a screen transition to receive information on a specific subject. As illustrated, during on-road driving, it is possible to input a zoom request near a destination by touching a corresponding portion so that the vicinity of an entrance of the destination may be magnified as a specific target region Z. Such a touch operation of the user is interpreted as a camera switching input by the central processor 41 of the application processor 40, and the central processor 41 may generate a camera switching control signal corresponding to the camera switching input.

For a smooth image transition, the application processor 40 may gradually magnify the target region Z in the pre-transition wide-angle image W. A minimum zoom factor of a switchover region corresponding to a default zoom factor of the telephoto camera is ×3, and a maximum zoom factor of the switchover region is ×4. In the case of camera switching from the wide-angle camera to the telephoto camera, the minimum zoom factor is a switching start signal, and the maximum zoom factor is a switching end signal. Distortion may be included in a wide-angle image (×$W_R$) and a telephoto image (×$T_R$) to which an input zoom factor has been applied. After distortion of the two images is geometrically corrected, the two images may be aligned with each other horizontally. After the two images are aligned, it is possible to generate virtual viewpoint images V1, V2, and V3 by synthesizing a wide-angle image (×W) and a telephoto image (×T) to which the input zoom factor has been applied. The virtual viewpoint images V1, V2, and V3 are generated according to zoom factor inputs of ×3.3, ×3.6, and ×3.8, respectively, and may be generated in consideration of the zoom factors and a disparity. The wide-angle image is magnified up to an input zoom factor of ×3 by digital zooming and output. At ×3 to ×4, the virtual viewpoint images V1, V2, and V3 generated by synthesizing a wide-angle image ×W and a telephoto image ×T are output. At ×4 or greater, a telephoto image ×T is output.

In the exemplary embodiment shown in the drawing, a zoom factor of ×4 is finally input. Therefore, the vicinity of the entrance of the destination is output as a telephoto image (×4T), and information on the entrance is displayed together so that information may be provided to the user in real time. As the information on the entrance, an available time and a path behind the entrance may be included.

FIG. 13A is a block diagram of an augmented information provider of an electronic system. FIG. 13B is a flow diagram illustrating an example method of providing augmented information from the augmented information provider to a digital photographing device according to an exemplary embodiment Referring to FIG. 13A, an augmented information provider 200 may include an augmented information storage 210, a matcher 220, a controller 230, and a communicator 240.

The augmented information storage 210 may be a database (DB) in which map information is stored (a map DB). The stored map information may include guide information, depth information, and location information of buildings and geographic features included in a map.

The matcher 220 may compare location information of an image output on a digital photographing device 100 with the stored map information and select information to be provided.

The controller 230 may receive a request for stored augmented information from the digital photographing device 100 through the communicator 240. In response to the request, the controller 230 may transmit augmented information corresponding to the output image of the digital photographing device 100 to the communicator 80 of the digital photographing device 100.

Referring to FIGS. 13B, 6A and 6B, in operation S410, the application processor 40 of the digital photographing device 100 acquires real-time images and location information using the cameras 10 and 20. The real-time images are acquired from the cameras 10 and 20 of the digital photographing device 100. The location information is information on a location at which the images are acquired through the plurality of cameras. The location information may be acquired through the GPS receiver 70 connected to the application processor 40. The user may input a signal for magnifying a specific target region Z in an image output on the display 50 of the digital photographing device 100.

In operation S420, the application processor 40 of the digital photographing device 100 may request augmented information of the target region Z designated by the user and a subject included in the target region Z from the augmented information provider 200 through the communicator 80. The augmented information provider 200 may receive the request for augmented information, location information and direction information of an output image, and the acquired real-time images through the communicator 240.

In operation S430, the matcher 220 of the augmented information provider 200 may compare the received real-time images with an actual image map matched to the received real-time images.

In operation S440, the matcher 220 may determine augmented information corresponding to the received real-time images.

In operation S450, the communicator 240 may transmit the corresponding augmented information to the communicator 80 of the digital photographing device 100 according to a command of the controller 230.

In operation S460, the application processor 40 of the digital photographing device 100 may generate a composite image by synthesizing the real-time images acquired through the plurality of cameras and the augmented information received from the augmented information provider 200.

In operation S470, the application processor 40 of the digital photographing device 100 may control the composite image to be displayed. The composite image may also be generated by the augmented information provider 200 and transmitted to the digital photographing device 100.

The augmented information provider 200 may be configured as a server which is located at a remote place from the digital photographing device 100 or may be formed in the digital photographing device 100.

FIG. 14 is a diagram showing a camera switching method of an electronic system including a digital photographing device according to an exemplary embodiment. With this method, digital photographing device 100 may acquire a wide-angle image through a wide-angle camera WC and acquire a telephoto image through a telephoto camera TC. When a user inputs camera switching through the input section 60 while the wide-angle image is being output on the display 50, a camera which photographs a displayed image may be switched from the wide-angle camera WC to the telephoto camera TC. An operation for an image transition input of the user may be a multi-touch operation. The image transition input of the user may be made through a graphical user interface (GUI) implemented on the display 50 or may be performed by sensing biometric information of the user, e.g. through a front camera lens or other sensor 62.

Referring to FIG. 14, the user may input a zoom factor command (a zoom request) for a specific region by touching a portion of the wide-angle image. The input section 60 is a touch screen. The central processor 41 of the application processor 40 of the digital photographing device 100 receives the zoom factor input of the user. The received zoom factor input of the user may be interpreted as including a camera switching input, and a camera switching control signal corresponding to the camera switching input may be generated. Due to the camera switching input, an output image may be switched to a telephoto image of an object touched by the user. During the image transition, the wide-angle image may be magnified up to the default zoom factor of the telephoto camera, output, and then switched to the telephoto image. Virtual viewpoint images may be generated between the magnified wide-angle image and the telephoto image and continuously output in a temporal sequence between the pre-transition and post-transition images.

According to an exemplary embodiment, a time required for an image transition may be reduced according to a camera switching input method of the user. A simpler camera switching input may lead to a faster image transition. For example, when a navigation system of a car is required to urgently magnify a subject existing far away, a telephoto image of the subject may be rapidly output by only one touch operation of the user.

As a camera switching input method of the user, gaze detection may be used. The digital photographing device 100 may include a sensor 62 for detecting the user's gaze as the input section 60. The application processor 40 may detect the user's gaze staying at a certain portion of the wide-angle image for a certain time or more and interpret the gaze as a camera switching input.

According to exemplary embodiments of the present disclosure, it is possible to smoothly switch between display images of a common scene which are captured through different respective cameras, where the images have a disparity between them due to distance between the cameras. Thus, it is possible to avoid image artifacts such as jerkiness that would otherwise be perceptible during such a camera switch.

Also, according to various exemplary embodiments, it is possible to minimize power consumption during a transition between output images.

Further, according to various exemplary embodiments, it is possible to ensure the speed of image transition processing by increasing an output image transition speed.

Although exemplary embodiments of the present disclosure have been described above, those of ordinary skill in the art to which the present disclosure pertains will appreciate that technology according to the present disclosure may be implemented in other detailed forms without departing from the technical spirit or essential characteristics of the present disclosure. Accordingly, the above-described exemplary embodiments should be construed as being only illustrative not as being restrictive from all aspects.

What is claimed is:

1. An application processor comprising:
an input/output (I/O) interface configured to receive a user input including a zoom factor; and
a central processor configured to:
while a first image of a scene acquired from a first camera of a photographing apparatus is displayed, the first camera being disposed at a first position and having a first angle of view, receive from the I/O interface a signal indicative of a first zoom factor greater than a minimum zoom factor of a switchover region, and in response generate a control signal so that a current first image acquired by the first camera is digitally zoomed to generate a zoomed first image, and a second image of at least a portion of the scene is acquired by a second camera disposed at a second position of the photographing apparatus and having a narrower angle of view, the second image being acquired by the second camera according to the first zoom factor substantially simultaneously with the acquiring of the first image by the first camera;
generate one or more third images, which are virtually acquired at one or more third positions between the first position and the second position, using the zoomed first image and the second image, and cause the one or more third images to be sequentially displayed after the displaying of the first image; and
if the zoom factor becomes a maximum zoom factor of the switchover region, cause a current second image acquired by the second camera according to the maximum zoom factor to be displayed.

2. The application processor of claim 1, wherein the minimum zoom factor of the switchover region is a default zoom factor of the first camera, and the maximum zoom factor is a set zoom factor.

3. The application processor of claim 1, wherein the central processor causes the one or more third images to be displayed in order from a third image acquired at a third position closer to the first position than to the second position, to a third image acquired at a third position closer to the second position than to the first position.

4. The application processor of claim 1, further comprising an image signal processor (ISP) configured to perform image signal processing on the first image and the second image before the one or more third images are generated.

5. The application processor of claim 4, wherein the central processor receives a user input corresponding to a zoom factor between the minimum zoom factor of the switchover region and the maximum zoom factor of the switchover region through the input/output interface, and generates a control signal for switching cameras in response to the user input.

6. The application processor of claim 5, further comprising an image generator for camera switching configured to generate a disparity map between the first image having undergone image signal processing and the second image having undergone image signal processing in response to the control signal of the central processor, and to generate the one or more third images based on the disparity map.

7. The application processor of claim 5, further comprising a memory configured to store a camera switching program,
wherein the central processor generates a disparity map between the first image having undergone image signal processing and the second image having undergone image signal processing by executing the camera switching program, and generates the one or more third images based on the disparity map.

8. The application processor of claim 1, wherein before generating the one or more third images, the central processor aligns the zoomed first image and the second image and generates a disparity map based on the aligned zoomed first image and second image.

9. The application processor of claim 1, wherein a biometric signal of a user sensed through an input section is received through the input/output interface and transferred to the central processor, and
the central processor generates a control signal for switching camera corresponding to the biometric signal of the user.

10. The application processor of claim 1, wherein when any control signal generated in response to a signal received from the I/O interface indicative of a zoom factor between minimum zoom factor and the maximum zoom factor is generated for a predetermined time or more, the central processor causes the second image to be displayed.

11. The application processor of claim 1, wherein the central processor sets a frame rate of the one or more third images to be different from a frame rate of the first image and the second image.

12. The application processor of claim 1, wherein:
the control signal is generated in response to a zoom request signal for a specific region in the first image while the first image is displayed; and
the one or more third images are generated using image elements of the zoomed first image including the specific region, and image elements of the second image including the specific region.

13. An application processor comprising:
an input/output (I/O) interface configured to receive a user input including a zoom factor; and
a central processor configured to:
while a first image of a scene acquired from a first camera of a photographing apparatus is displayed, the first camera being disposed at a first position and having a first angle of view, receive from the I/O interface a signal indicative of a first zoom factor less than a maximum zoom factor of a switchover region, and in response generate a control signal so that a second image acquired by a second camera is digitally zoomed to generate a zoomed second image, and a current first image is acquired by the first camera according to the first zoom factor, substantially simultaneously with the acquiring of the second image by the second camera, wherein the first camera has a narrower angle of view than that of the second camera and the second camera is disposed at a second position of the photographing apparatus;

generate one or more third images, which are virtually acquired at one or more third positions between the first position and the second position, using the zoomed second image and the current first image, and cause the one or more third images to be sequentially displayed after the displaying of the first image; and if the zoom factor becomes a minimum zoom factor of the switchover region, cause a current second image acquired by the second camera to be displayed according to the minimum zoom factor.

14. The application processor of claim 13, wherein the central processor causes the one or more third images to be displayed in order from a third image acquired at a third position closer to the second position than to the first position, to a third image acquired at a third position closer to the first position than to the second position.

15. The application processor of claim 13, wherein when any control signal generated in response to a signal received from the I/O interface indicative of a zoom factor between the minimum zoom factor and the maximum zoom factor is generated for a predetermined time or more, the central processor causes the zoomed first image to be displayed.

16. A photographing apparatus comprising:
a wide-angle camera disposed at a first position and a second camera disposed at a second position;
an application processor comprising:
an input/output (I/O) interface configured to receive a user input including a zoom factor; and
a central processor configured to:
acquire a wide-angle image captured by the wide-angle camera, and display the wide-angle image;
receive a switching input from the I/O interface, which includes a first input zoom factor that is greater than a minimum zoom factor of a switchover region;
acquire a current wide-angle image captured by the wide-angle camera and digitally zoom the current wide-angle image with the first input zoom factor to generate a zoomed wide-angle image;
acquire a second image captured by the second camera according to the first input zoom factor;
generate one or more third images, which are virtually acquired at one or more third positions between the first position and the second position, using elements of the zoomed wide-angle image and the second image, in response to the switching input; and
cause the one or more third images to be sequentially displayed after the displaying of the wide-angle image.

17. The photographing apparatus of claim 16, wherein the central processor causes the one or more third images to be displayed in order from a third image acquired at a third position closer to the first position than to the second position, to a third image acquired at a third position closer to the second position than to the first position.

18. The photographing apparatus of claim 16, wherein the application processor further comprises an image signal processor (ISP) configured to perform image signal processing on the wide-angle image and the second image.

19. The photographing apparatus of claim 18, further comprising an image generator for camera switching configured to generate a disparity map between the wide-angle image having undergone image signal processing and the second image having undergone image signal processing in response to a control signal, and to generate the one or more third images based on the disparity map.

20. The photographing apparatus of claim 18, wherein the application processor further comprises a memory configured to store a camera switching program,
wherein the central processor generates a disparity map between the wide-angle image having undergone image signal processing and the second image having undergone image signal processing by executing the camera switching program, and generates the one or more third images based on the disparity map.

* * * * *